(12) United States Patent
Masuda et al.

(10) Patent No.: US 7,772,970 B2
(45) Date of Patent: Aug. 10, 2010

(54) VEHICLE DISPLAY DEVICE

(75) Inventors: Toshio Masuda, Tokyo (JP); Kenichi Yamamoto, Tokyo (JP); Kenji Hijikata, Tokyo (JP); Satoshi Satomura, Tokyo (JP); Hiroshi Oishi, Tokyo (JP); Toyohide Sunaguchi, Tokyo (JP); Yoshio Iwakami, Tokyo (JP); Munenori Homma, Tokyo (JP); Kouji Kaneda, Tokyo (JP); Atsushi Atake, Tokyo (JP); Tatsuru Fukuda, Tokyo (JP); Masayuki Ushiki, Tokyo (JP); Minoru Yuki, Tokyo (JP); Tsuyoshi Kobayashi, Tokyo (JP); Masahito Motoi, Tokyo (JP); Naoki Shibata, Tokyo (JP); Hiroshi Ogiwara, Tokyo (JP); Katsumasa Igarashi, Tokyo (JP); Junzo Shinozuka, Tokyo (JP); Akihisa Nakamura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 506 days.

(21) Appl. No.: 11/783,111

(22) Filed: Apr. 5, 2007

(65) Prior Publication Data

US 2007/0247291 A1 Oct. 25, 2007

(30) Foreign Application Priority Data

Apr. 7, 2006 (JP) ............................. 2006-106147
Oct. 19, 2006 (JP) ............................. 2006-285114

(51) Int. Cl.
*B60Q 1/00* (2006.01)

(52) U.S. Cl. .................. 340/439; 340/438; 340/815.78; 340/456; 73/114.52; 73/114.54; 701/99; 701/103; 701/104; 701/123

(58) Field of Classification Search ................. 340/438, 340/439, 441, 691.1, 691.2, 691.6, 691.7, 340/450.2, 5.32; 701/99, 103, 104, 123; 73/114.52, 114.53, 114.54

See application file for complete search history.

(56) References Cited

U.S. PATENT DOCUMENTS 3,908,451 A * 9/1975 Walker et al. ............ 73/114.53

(Continued)

FOREIGN PATENT DOCUMENTS

JP 52-29269 3/1977

(Continued)

OTHER PUBLICATIONS

Japanese Office Action dated Dec. 26, 2006.

*Primary Examiner*—Daniel Wu
*Assistant Examiner*—Son M Tang
(74) *Attorney, Agent, or Firm*—McGinn IP Law Group, PLLC

(57) ABSTRACT

The present invention provides a vehicle display device which can display fuel consumption information of a vehicle in a useful and optimum mode for a driver. A meter_EUC calculates an instantaneous fuel consumption of a vehicle based on a mileage and a fuel injection quantity within a set time, calculates an average fuel consumption of the vehicle based on respective cumulative values of the mileage and the fuel injection quantity repeatedly calculated for every set time, and displays the deviation of the instantaneous fuel consumption with respect to the average fuel consumption as fuel consumption information on a fuel consumption meter. The display on the fuel consumption meter is performed by swinging a pointer with respect to a neutral position. When the deviation takes a positive value, the pointer is swung in the pulse direction with a swinging width corresponding to the deviation quantity, while when the deviation takes a negative value, the pointer is swung in the minus direction with a swinging width corresponding to the deviation quantity.

19 Claims, 14 Drawing Sheets

U.S. PATENT DOCUMENTS

| | | | | |
|---|---|---|---|---|
| 3,922,909 A | * | 12/1975 | Dixson et al. | 73/114.53 |
| 4,050,295 A | * | 9/1977 | Harvey | 73/114.53 |
| 4,166,382 A | * | 9/1979 | Petersen | 73/114.53 |
| 4,210,908 A | * | 7/1980 | Sakakibara | 345/40 |
| 4,247,757 A | * | 1/1981 | Crump, Jr. | 235/61 J |
| 4,342,023 A | * | 7/1982 | Tsunoda et al. | 340/460 |
| 4,378,694 A | * | 4/1983 | Bohm et al. | 73/114.53 |
| 4,400,779 A | * | 8/1983 | Kosuge et al. | 701/123 |
| 4,437,342 A | * | 3/1984 | Hosaka et al. | 73/114.52 |
| 4,475,380 A | * | 10/1984 | Colovas et al. | 73/114.53 |
| 4,590,568 A | * | 5/1986 | Barske et al. | 701/93 |
| 4,647,902 A | * | 3/1987 | Teshima et al. | 340/439 |
| 4,663,718 A | * | 5/1987 | Augello et al. | 701/201 |
| 4,706,083 A | * | 11/1987 | Baatz et al. | 701/123 |
| 4,845,630 A | * | 7/1989 | Stephens | 701/123 |
| 5,627,752 A | * | 5/1997 | Buck et al. | 701/35 |
| 6,092,021 A | * | 7/2000 | Ehlbeck et al. | 701/123 |
| 6,453,731 B1 | * | 9/2002 | Yaegashi | 73/114.52 |
| 6,694,806 B2 | * | 2/2004 | Kumagai et al. | 73/114.52 |
| 6,975,217 B2 | * | 12/2005 | Endoh | 340/438 |
| 7,237,203 B1 | * | 6/2007 | Kuenzner | 715/764 |

FOREIGN PATENT DOCUMENTS

| | | | |
|---|---|---|---|
| JP | 53-021549 | | 8/1978 |
| JP | 10-142001 | | 5/1998 |
| JP | 2961660 | | 8/1999 |
| JP | 2000-88625 | | 3/2000 |
| JP | 3207310 | | 7/2001 |
| JP | 2003-72418 | | 3/2003 |
| JP | 2004210086 A | * | 7/2004 |

* cited by examiner

VEHICLE DISPLAY DEVICE

CROSS-REFERENCE TO RELATED APPLICATIONS

The disclosures of Japanese Application No. 2006-106147 filed on Apr. 7, 2006 and No. 2006-285114 filed on Oct. 19, 2006 including the specification, drawings and abstract is incorporated herein by reference in its entirety.

BACKGROUND OF THE INVENTION

1. Field of the Invention

The present invention relates to a vehicle display device which displays vehicle driving information of a vehicle to a driver.

2. Description of the Related Art

Conventionally, as a man-machine interface which transmits various information such as vehicle driving information to a driver, on an instrument panel, various display devices such as a combination meter, a display device and the like are mounted. Recently, this type of display device is requested to display detailed information covering a wide range along with a demand for the realization of low-fuel-consumption driving and the sophistication of functions of a drive system.

Accordingly, for example, Japanese Patent 2961660 discloses a fuel consumption quantity relative display device for displaying a magnitude of the relative fuel consumption quantities per a fixed time under a current driving state relative to the reference driving state. In this Japanese Patent, the reference driving state is set as a driving state of an engine when a driver manipulates the engine by manipulating a push button, and a fuel consumption quantity in the reference driving state is calculated. The magnitude of the relative fuel consumption is calculated by calculating a fuel consumption quantity under a current driving state and comparing these fuel consumption quantities with each other.

SUMMARY OF THE INVENTION

However, as in the case of the technique disclosed in the above-mentioned Japanese Patent, with the constitution in which the reference driving state to be compared with the current driving state is set based on the switch manipulation of the driver, the proper driving state is not always set as the reference driving state and hence, there may be a case in which a display of the useful vehicle traveling information to the driver becomes difficult. Particularly, for example, when the driving state when the engine is in an idling state is set as the reference driving state, there exists a possibility that the relative display of the fuel consumption quantity becomes meaningless.

Further, it is important for this type of display device to provide a display mode which can allow the driver during traveling to easily recognize the fuel consumption information which changes second by second with naked eyes.

The present invention has been made under such circumstances and it is an object of the present invention to provide a vehicle display device which can display fuel consumption information of a vehicle in a useful and optimum mode for the driver.

The present invention is directed to a vehicle display device which includes: an instantaneous fuel consumption calculation unit for calculating an instantaneous fuel consumption of a vehicle based on a mileage and a fuel injection quantity within a preset set time; an average fuel consumption calculation unit for calculating an average fuel consumption of the vehicle based on a cumulative value of the mileage and the cumulative value of the fuel injection quantity; a display unit for having a pointer type meter for displaying the deviation of the instantaneous fuel consumption with respect to the average fuel consumption as the fuel consumption information based on swinging of a pointer with respect to a neutral position; and the display control unit for controlling said display unit so as to display the fuel consumption information by swinging the pointer in the plus direction set on one side of the neutral position with a swinging width corresponding to the deviation quantity when the deviation takes a positive value, and swinging the pointer in the minus direction set on another side of the neutral position with a swinging width corresponding to the deviation quantity when the deviation takes a negative value.

According to a second aspect of this invention according to the first aspect, regions in which the pointer swings are displayed with colors different from each other between the plus side and the minus side with respect to the neutral position.

According to a third aspect of this invention according to the first aspect, said display unit is arranged on a speed meter.

According to a fourth aspect of this invention according to the first aspect, said average fuel consumption calculation unit calculates a value which is obtained by leveling an average fuel consumption which is directly calculated based on the cumulative value of the mileage and the cumulative value of the fuel injection quantity by weighted average calculation by using the past average fuel consumption as a final average fuel consumption, and a weighting coefficient used in the weighted average calculation is a value which sensitively changes the deviation between the average fuel consumption and the instantaneous fuel consumption with respect to an accelerator operation of a driver in an at least preset specified region.

According to a fifth aspect of this invention according to the fourth aspect, the specified region is a region which indicates the deviation calculated corresponding to at least an acceleration manipulation quantity which the driver actually feels that the acceleration manipulation is performed and the deviation with which the average fuel consumption is hardly changed with respect to the instantaneous fuel consumption.

According to a sixth aspect of this invention according to the fifth aspect, the display control unit sets a full scale of the display unit such that the specified region occupies approximately ⅕ of the whole display means.

According to a seventh aspect of this invention according to the sixth aspect, the display control unit sets the full scale of the display unit such that the region which indicates the deviation when the average fuel consumption is largely changed with respect to the instantaneous fuel consumption occupies approximately ¼ of the whole display unit respectively on the plus side and the minus side with respect to the neutral position of the display means which constitutes a 0 point.

According to a eighth aspect of this invention according to the fourth aspect, the vehicle display device is mounted on a vehicle which is capable of changing over a drive force characteristic of a power unit into a plurality of modes, and the average fuel consumption calculation unit performs the weighted average calculation using weighting coefficients which differ for respective modes.

According to a ninth aspect of this invention according to the eighth aspect of this invention, the values of the weighting coefficient is that when the mode of the drive force characteristic has larger responsiveness with respect to the accelerator operation of the driver, the mode takes a relatively larger value than other mode.

According to a tenth aspect of this invention according to the first invention, the average fuel consumption value calculation unit resets the cumulative values of the mileage and the fuel injection quantity interlockingly with a reset manipulation of a trip meter by the driver.

According to an eleventh aspect of this invention according to tenth aspect, the average fuel consumption calculation unit calculates plural sets of combinations of the cumulative value of the mileage and the cumulative value of the fuel injection quantity using different reset timings as starting points and obtains the average fuel consumption for every set, the display control means obtains the deviation with the instantaneous fuel consumption using the average fuel consumption which the driver selects out of the plurality of average fuel consumptions.

According to twelfth aspect of this invention according to the first aspect, the display control unit exponentially increases a change quantity of a control indication value when the deviation is displayed on the display unit as fuel consumption information along with the increase of the deviation quantity.

Furthermore, the thirteenth aspect of this invention according to twelfth aspect, the vehicle-use display device is mounted on the vehicle capable of changing over a drive force characteristic of a power unit into a plurality of modes, and the display control unit makes tracking characteristic with respect to a target value of swinging of the pointer different for every mode.

According to the vehicle display device of the present invention, the display device can display a fuel consumption information of a vehicle in a useful and optimum mode for a driver.

DESCRIPTION OF THE PREFERRED EMBODIMENTS

Figure 1:
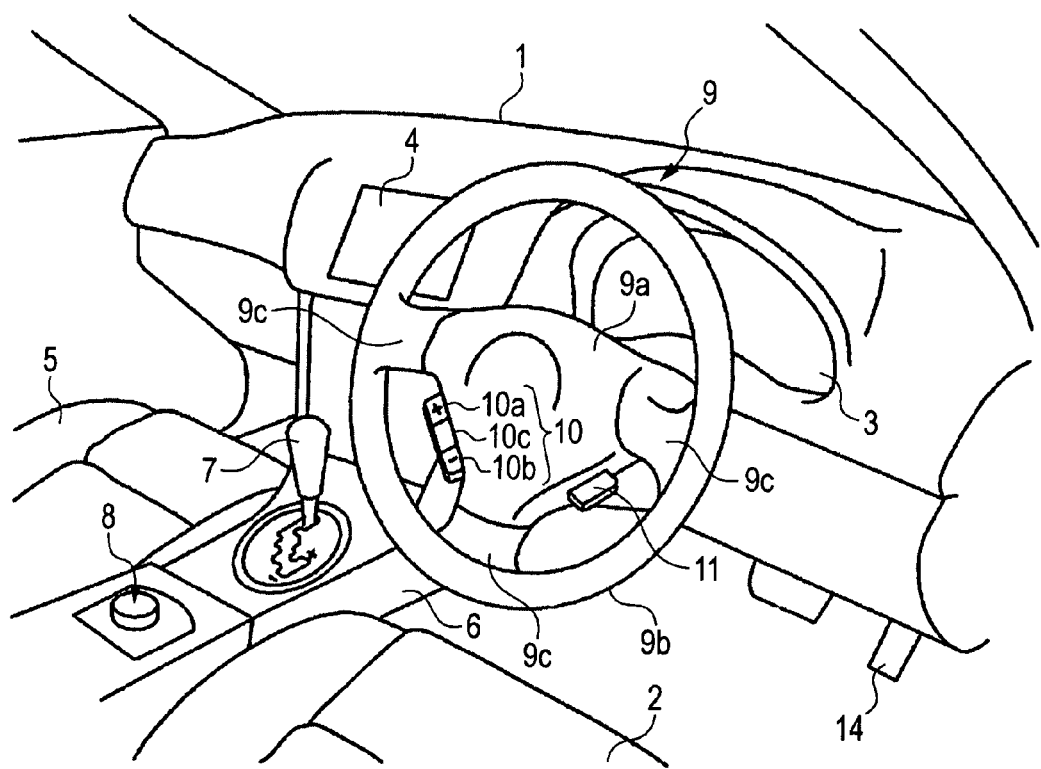
FIG. 1 is a perspective view of an instrument panel and a center console as viewed from a driver's seat side.

As shown in FIG. 1, the instrument panel 1 which is arranged in a front portion in the inside of a cabin of a vehicle extends laterally in the vehicle width direction, and a combination meter 3 is arranged on the instrument panel 1 which is positioned in front of a driver's seat 2. Further, at the substantially center of the instrument panel 1 in the vehicle width direction, a center display 4 which is used as a display means constituting a well-known car navigation system is arranged.

Further, on a center console 6 which is arranged between the driver's seat 2 and a passenger seat 5 and extends toward a rear side of a vehicle body from the instrument panel 1 side, a selection lever 7 which is used to select a range of an automatic transmission is arranged, and a mode selection switch 8 which is used as a selection means for selecting driving force characteristic of an engine is arranged behind the selection lever 7. Further, a steering wheel 9 is arranged in front of the driver's seat 2.

The steering wheel 9 includes a center pad portion 9a which houses an air bag or the like, and the center pad portion 9a and left, right and lower portions of a grip portion 9b which is arranged around the center pad portion 9a are connected with each other by way of 3 spokes 9c. A display changeover switch 10 which is used as a display changeover means is arranged on a left lower portion of the center pad portion 9a. Further, a temporarily changeover switch 11 which is used as a temporarily changeover means is arranged on a right lower portion of the center pad portion 9a.

Figure 2:
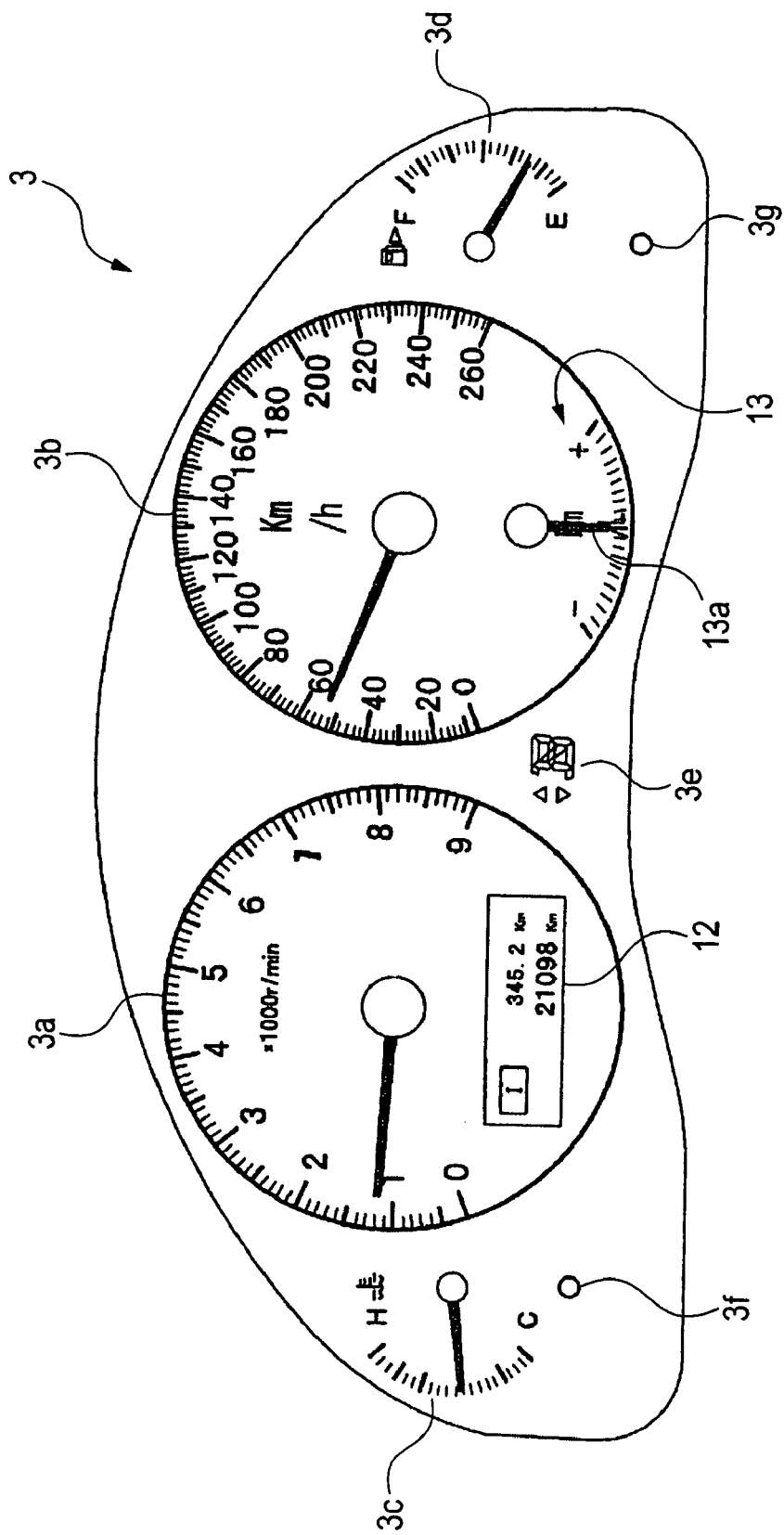
FIG. 2 is a front view of a combination meter.

Further, as shown in FIG. 2, on left and right sides of the combination meter 3 close to the center, a tachometer 3a which indicates an engine rotational speed and a speed meter 3b which indicates a vehicle speed are respectively arranged. Further, a water temperature meter 3c which indicates a cooling water temperature is arranged on the left side of the tachometer 3a, and a fuel level meter 3d which indicates residual fuel quantity is arranged on the right side of the speed meter 3b. Further, a gearshift position display portion 3e which indicates a current position of gearshift is arranged on a center portion of the combination meter 3. Here, symbol 3f indicates a warning lamp, and symbol 3g indicates a trip reset switch which resets a trip meter. A push button of the trip reset switch 3g projects toward the driver's seat 2 side from the combination meter 3, and the trip meter is reset when the driver or the like continuously turns on the trip reset switch 3g for a predetermined time or more by pushing the push button.

Further, on a lower portion of the tachometer 3a, a multi information display (hereinafter, abbreviated as "MID") 12 which is used as a display means for respectively displaying information such as mileage, fuel consumption, the engine driving force by changing over a plurality of display images is arranged. Further, on a lower portion of the speed meter 3b, a fuel consumption meter 13 which indicates a state of fuel efficiency based on the difference between the instantaneous fuel consumption and the trip average fuel consumption is arranged.

Figure 3:
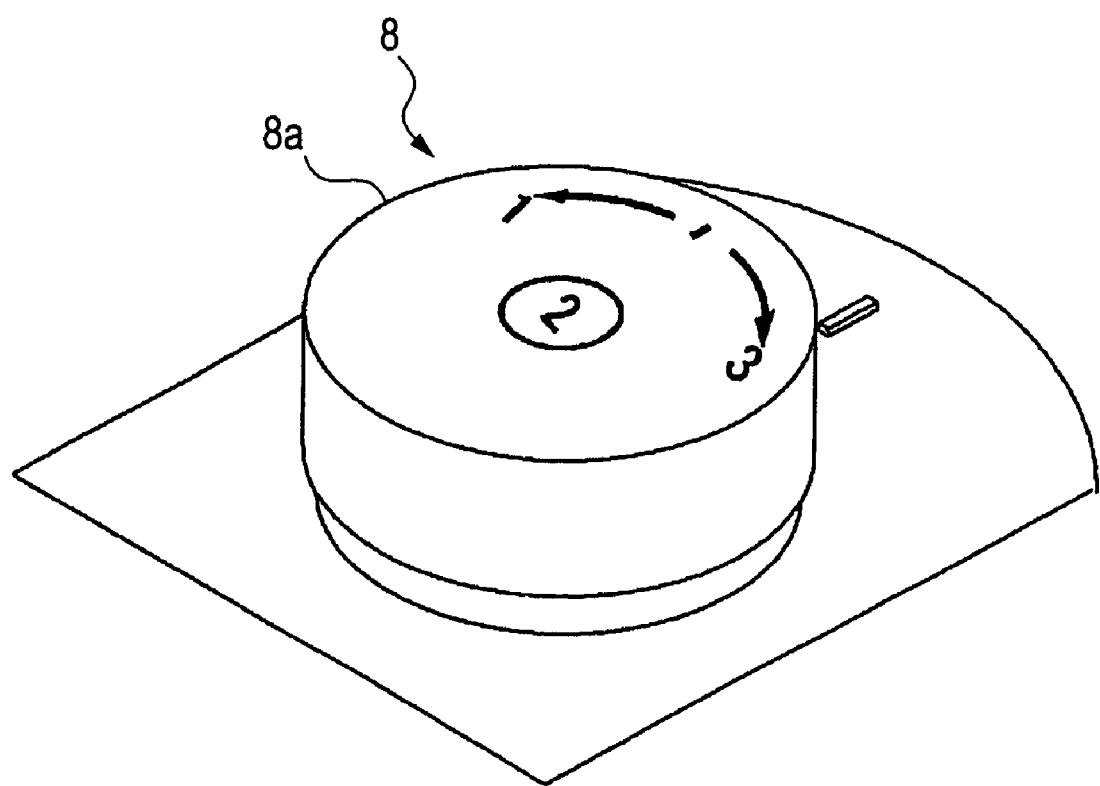
FIG. 3 is a perspective view of a mode selection switch.

Further, as shown in FIG. 3, the mode selection switch 8 is a shuttle switch which arranges a push switch parallel thereto. When an operator (since the operator is generally the driver, the explanation is made by referring the operator as "driver" hereinafter) manipulates a manipulation knob 8a, the driver can select three kinds of modes described later (a normal mode 1 which is a first mode, a save mode 2 which is a second mode, and a power mode 3 which is a third mode). That is, in this embodiment, by rotating the manipulation knob 8a in the left direction, a left switch is turned on and the normal mode 1 is selected. By rotating the manipulation knob 8a in the right direction, a right switch is turned on and the power mode 3 is selected. On the other hand, by pushing the manipulation knob 8a in the lower direction, the push switch is turned on and the save mode 2 is selected. Here, by allocating the save mode 2 to the push switch, even when the push switch is turned on erroneously during traveling, for example, the mode is just changed over to the save mode 2 where an output torque is suppressed as described later, hence there is no possibility that the driving force is acutely increased thus ensuring the safe driving of the driver.

Here, output characteristics of the respective modes 1 to 3 are briefly explained. The normal mode 1 is set such that an output torque is changed approximately linearly with respect to a operation amount of the accelerator pedal 14 (accelerator opening degress) (see FIG. 11A). The normal mode 1 is a mode which is suitable for normal driving.

Further, the save mode 2 is set as a mode in which by saving an engine torque alone or by saving an engine torque in synchronism with a lock-up control in case of an automatic transmission, smooth output characteristic is obtained while ensuring a sufficient output thus allowing a driver to enjoy the acceleration work. Further, in the save mode 2, the output torque is suppressed and hence, it is possible to achieve both of the easy drive ability and low fuel consumption (economical efficiency) in a well balanced manner. Further, for example, even in case of a vehicle with a 3 litter engine, the smooth output characteristic is obtained while ensuring a sufficient output corresponding to the 2 litter engine. Particularly, the easy-to-drive performance is achieved in a practical-use region such as traveling in towns.

The power mode 3 is set as a mode in which the output characteristics with an excellent response from a low speed region to a high speed region of the engine is achieved and, at the same time, in case of an automatic transmission, a shift-up point is changed in accordance with engine torque, hence the vehicle can cope with a sporty or zippy driving on a winding load or the like. That is, in the power mode 3, the high response characteristic is set with respect to the operation amount of the accelerator pedal 14 and hence, in case of a vehicle with a 3 litter engine, for example, a maximum torque is generated at a lower operation amount of the accelerator pedal 14 such that a potential of the 3 litter engine can be exercised at maximum. Here, driving force indication values (target torques) of the respective modes (normal mode 1, save mode 2, power mode 3) are, as described later, set based on 2 parameters consisting of an engine rotational speed and accelerator opening degress.

Figure 4:
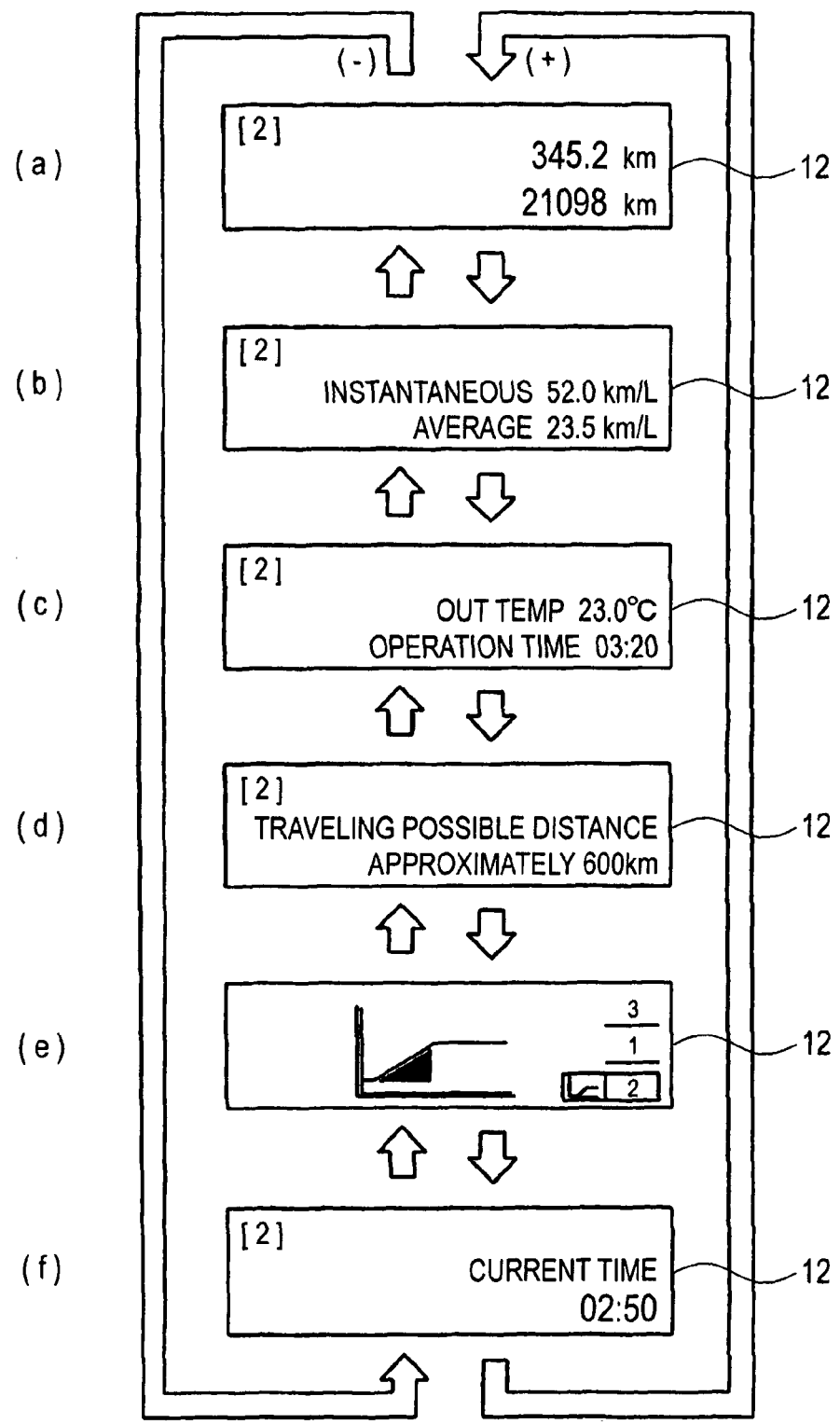
FIG. 4 is an explanatory view showing a display example of a multi-information display.

A display changeover switch 10 is manipulated to change over information displayed on a MID 12 and includes a forward feeding switch portion 10a, a reverse feeding switch portion 10b, and a reset switch portion 10c. FIG. 4 illustrates items for every images displayed on the MID 12 as an example. Here, the MID 12 may be a color display.

In this embodiment, 6 kinds of images (a) to (f) are set, wherein each time the forward feeding switch portion 10a is turned on, the images are changed over in order from (a) to (f). When the forward feeding switch portion 10a is turned on in a state that the image (f) is displayed, the initial image (a) is displayed. On the other hand, when the reverse feeding switch portion 10b is turned on, the image is changed over in the reverse direction.

The image (a) is an initial image which is displayed when the ignition switch is turned on. On the image (a), an odometer is displayed in a lower stage and a trip meter is displayed in an upper stage. Further, a current mode ("2" indicative of the save mode 2 in the drawing) is displayed at a left end of the image (a).

On the image (b), a mileage measured by the trip meter and a trip average fuel consumption [km/L] calculated based on a total fuel injection pulse width (pulse time) in the mileage are displayed in a lower stage, while a mileage during several seconds and an instantaneous fuel consumption [km/L] calculated based on the total fuel injection pulse width (pulse time) in the moment are displayed in an upper stage.

On the image (c), an operation time from a point of time that the engine is started is displayed in a lower stage and an outside temperature [° C.] is displayed in an upper stage.

On the image (d), an approximately traveling possible distance [Km] calculated based on residual fuel quantity in the inside of a fuel tank and the trip average fuel consumption is displayed.

On the image (e), an acceleration-torque line of the currently selected mode (the save mode 2 being indicated in the drawing) is displayed. In the acceleration-torque line, an output torque of the engine is taken on an axis of ordinates and the accelerator opening degress is taken on an axis of abscissas, and a power display region P is set in the inside of the displayed acceleration-torque line. In the power display region P, being interlocked with the increase or the decrease of the accelerator opening degress, the band showing the power level is linearly expanded or contracted in a transverse direction. Accordingly, by observing the displayed power level, the driver can easily grasp the current driving state.

The current time is displayed on the image (f).

Figure 5A:
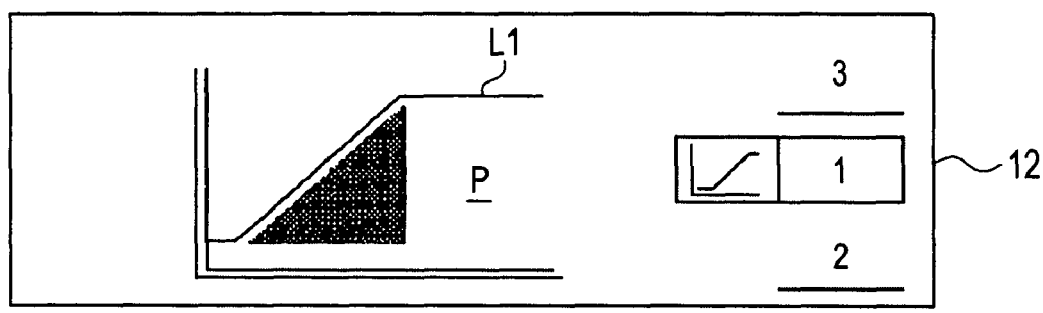
FIG. 5A to FIG. 5C are explanatory views showing a display example of the multi-information display at the time of changing over a mode.
Figure 5B:
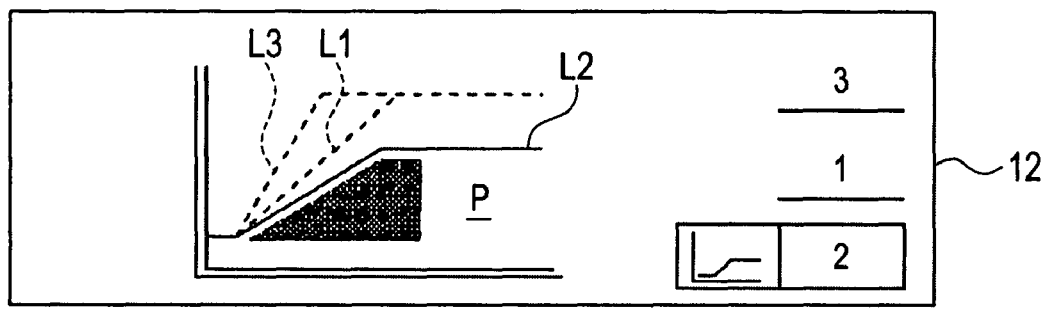
Figure 5C:
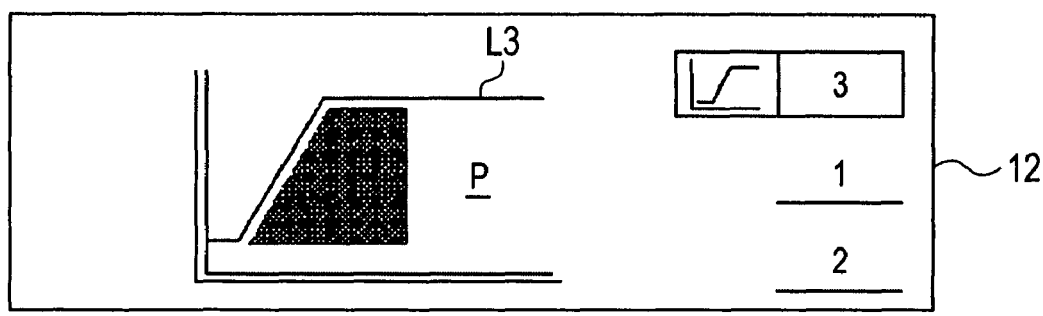

As shown in FIG. 5A to FIG. 5C, the above-mentioned acceleration-torque line displayed on the image (e) differs for every selected mode, that is, the normal mode 1, the save mode 2 or the power mode 3. FIG. 5A shows the acceleration-torque line L1 which constitutes a driving force characteristic line displayed when the normal mode 1 is selected. FIG. 5B shows the acceleration-torque line L2 which constitutes a driving force characteristic line displayed when the save mode 2 is selected. And FIG. 5C shows the acceleration-torque line L3 which constitutes a driving force characteristic line displayed when the power mode 3 is selected.

Here, the above-mentioned image (e) shown in FIG. 4 may be displayed on the MID 12 as an initial image when the ignition switch is turned on. In this case, immediately after the initial image is displayed, the respective acceleration-torque lines L1, L2, L3 are simultaneously displayed and, with a time delay, other acceleration-torque lines may be faded out while leaving only the acceleration-torque line corresponding to the currently set mode.

In FIG. 5B, to compare the driving force characteristics of the acceleration-torque lines L1, L2, L3 for respective modes, the acceleration-torque lines L1, L3 are indicated by a broken line in an overlapped manner. Here, these acceleration-torque lines L1, L3 are indicated for the conveniences sake and are not displayed in an actual operation. As shown in FIG. 5B, the power mode 3 possesses the characteristic which exhibits a larger throttle change quantity in response to a step-on operation of the accelerator pedal. Here, a larger target torque is set with respect to the accelerator opening degress. The normal mode 1 is set to possess the characteristic where the throttle opening is linearly arranged with respect to the operation amount of the accelerator pedal. Compared to the driving force characteristic of the power mode 3, the normal mode 1 possesses the characteristic which exhibits the relatively small throttle change quantity in response to the step-on operation of the accelerator pedal. That is, the normal mode 1 is set to acquire the favorable driving performance in a usual driving region where the accelerator opening degress is relatively small.

Further, the save mode 2 is set such that the driver can enjoy the acceleration work with the smooth output characteristic while ensuring a sufficient output.

Here, the content displayed in FIG. 5A to FIG. 5C (the image shown in FIG. 4(e)) may be always displayed on an information display which is separately provided in the inside of the tachometer 3a. Alternatively, only the display content shown in FIG. 5A to FIG. 5C is displayed on the MID 12 and other display contents shown in FIG. 4 may be displayed on an information display which is additionally provided.

Further, in the fuel consumption meter 13, a neutral position indicates the trip average fuel consumption [Km/L]. When the instantaneous fuel consumption [Km/L] is higher than the trip average fuel consumption [Km/L], a pointer 13a is swung in the plus (+) direction in response to the deviation, while when the instantaneous fuel consumption [Km/L] is lower than the trip average fuel consumption [Km/L], the pointer 13a is swung in the minus (−) direction in response to the deviation.

Figure 6:
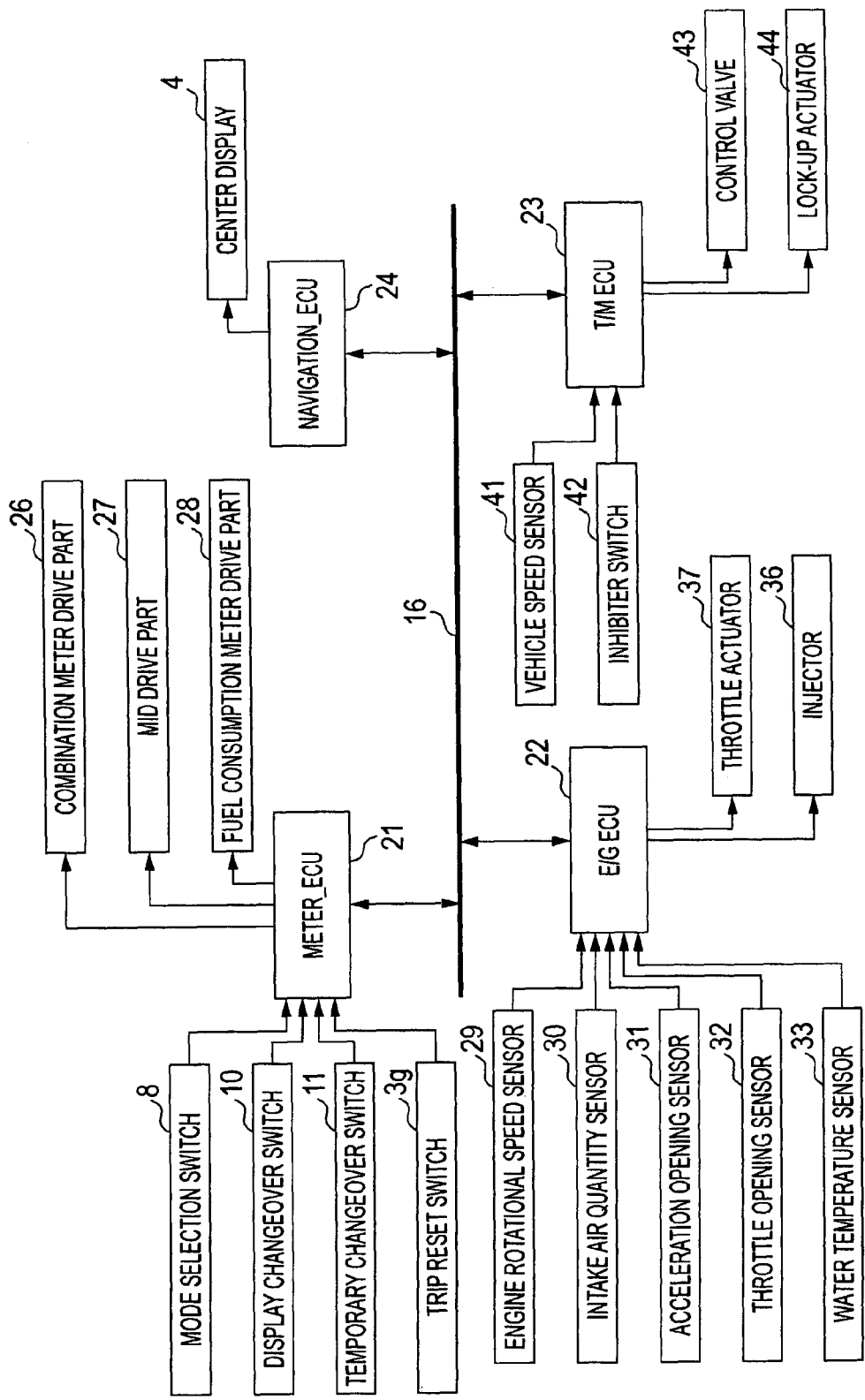
FIG. 6 is a constitutional view of a drive force control device.

Here, as shown in FIG. 6, to the vehicle, through an interior communication circuit 16 such as a CAN (Controller Area Network) communication, control devices which constitutes arithmetic operation means for controlling the vehicle such as a meter control device (meter_ECU) 21, an engine control device (E/G_ECU) 22, a transmission control device (T/M_ECU) 23, a navigation control device (navigation_ECU) 24 are connected in an intercommunicable manner. Each one of the ECU 21 to 24 is mainly constituted of a computer such as a microcomputer and includes well-known CPU, ROM, RAM and a non-volatile memory means such as EEPROM.

The meter_ECU 21 is provided for controlling the whole display of the combination meter 3. Here, the mode selection switch 8, the display changeover switch 10, a temporary changeover switch 11 and the trip reset switch 3g are connected to an input side of the meter_ECU 21, while instruments such as the tachometer 3a, the speed meter 3b, the water temperature meter 3c, the fuel meter 3d, a combination meter drive part 26 which drives the warning lamp 3f, an MID drive part 27, and a fuel meter drive part 28 are connected to an output side of the meter_ECU 21.

The E/G_ECU 22 is provided for controlling an operation state of the engine. To an input side of the E/G_ECU 22, a group of sensors which detect the vehicle and engine operation states such as an engine rotational speed sensor 29 which constitutes an operation state detection means for detecting an engine rotational speed which is a typical example of parameters indicating the engine operation state based on a rotation of a crankshaft or the like, an intake air quantity sensor 30 which is arranged immediately downstream of an air cleaner or the like and detects the intake air quantity, an accelerator opening sensor 31 which constitutes an accelerator opening detection means for detecting accelerator opening degress of the accelerator pedal 14, a throttle opening sensor 32 which is interposed in an intake passage and detects opening of a throttle valve (not shown in the drawing) for adjusting an intake air quantity supplied to respective cylinders of the engine, a water temperature sensor 33 which constitutes an engine temperature detection means for detecting cooling water temperature indicative of an engine temperature are connected. Further, to an output side of the E/G_ECU 22, a group of actuators which controls the driving of the engine such as an injector 36 which injects a predetermined measured fuel to a combustion chamber, a throttle actuator 37 which is mounted in an electronic throttle control device (not shown in the drawing) are connected.

The E/G_ECU 22 sets fuel injection timing and a fuel injection pulse width (pulse time) with respect to the injector 36 based on inputted detection signals from the respective sensors. Further, E/G_ECU 22 outputs the throttle driving signal to the throttle actuator 37 which drives the throttle valve thus controlling the opening of the throttle valve.

Figure 11A:
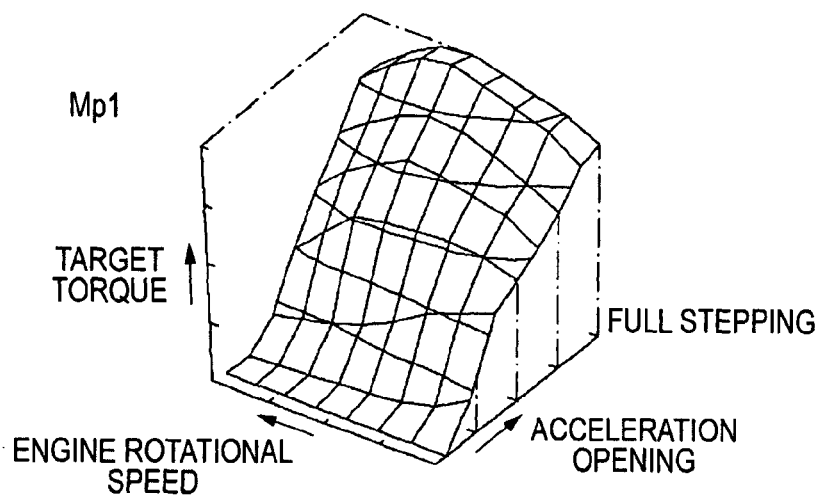
FIG. 11A is a conceptual view of a normal mode map.
Figure 11B:
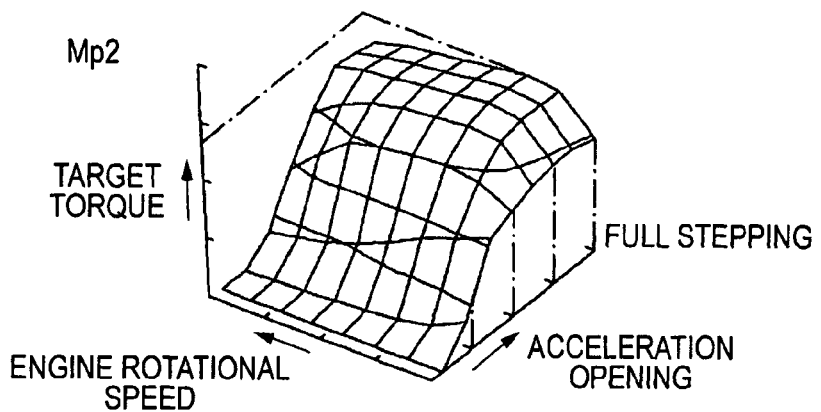
FIG. 11B is a conceptual view of a save mode map.
Figure 11C:
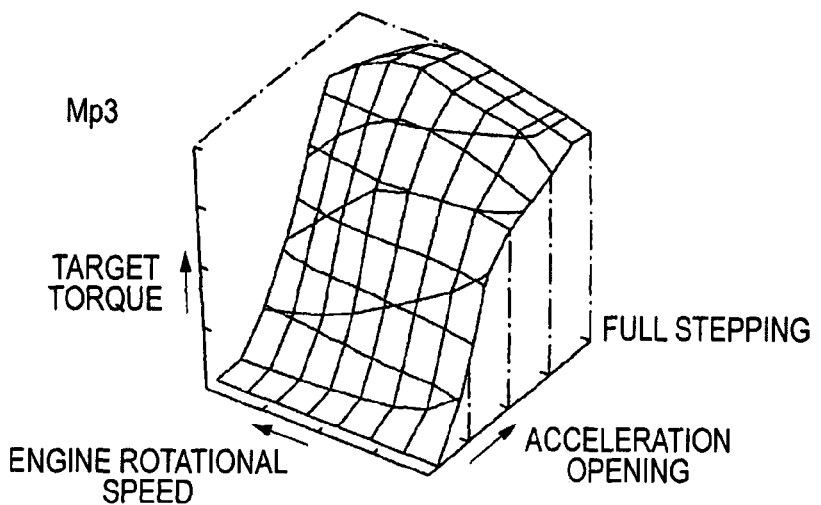
FIG. 11C is a conceptual view of a power mode map.

Here, in the volatile memory means which is provided to the E/G_ECU 22 and constitutes a portion of the driving force setting means, a plurality of different driving force characteristics is stored in a map form. As the respective driving force characteristics, in this embodiment, three kinds of mode maps Mp1, Mp2, Mp3 are provided. As shown in FIG. 11A to FIG. 11C, the respective mode maps Mp1, Mp2, Mp3 are configured as a three-dimensional map in which the accelerator opening degress and the engine rotational speed are taken on matrix axes, and driving force indication values (target torques) are stored in respective matrix points.

The respective mode maps Mp1, Mp2, Mp3 are basically selected by the manipulation of the mode selection switch 8. That is, when the normal mode 1 is selected by the mode selection switch 8, the normal mode map Mp1 which constitutes the first mode map is selected. When the save mode 2 is selected by the mode selection switch 8, the save mode map Mp2 which constitutes the second mode map is selected. Further, when the power mode 3 is selected by the mode selection switch 8, the power mode map Mp3 which constitutes the third mode map is selected.

Hereinafter, the driving force characteristics of the respective mode maps Mp1, Mp2, Mp3 are explained. The normal mode map Mp1 shown in FIG. 11A is set to exhibit the characteristic in which the target torque is linearly changed in a region where the accelerator opening degress is relatively small, and the maximum target torque is obtained when the opening of the throttle valve is close to a wide-open throttle.

Further, in the save mode map Mp2 shown in FIG. 11B, compared to the above-mentioned normal mode map Mp1, the elevation of the target torque is suppressed and hence, the driver can enjoy the acceleration work by widely using the stroke of the accelerator pedal 14. Further, since the elevation of the target torque is suppressed, it is possible to achieve both of the easy drive ability and the low fuel consumption in a well balanced manner. For example, in case of a vehicle with a 3 litter engine, the smooth output characteristic is obtained while ensuring a sufficient output corresponding to the 2 litter engine. Particularly, the target torque is set to achieve easy-to-drive performance in a practical-use region such as traveling in towns.

Further, in the power mode map Mp3 shown in FIG. 11C, a change rate of the target torque in response to the change of the accelerator opening degress is largely set in the substantially all driving region. Accordingly, for example, in case of a vehicle with a 3 litter engine, the target torque is arranged to maximize potential of the 3 litter engine. Here, the substantially same driving force characteristic is set in a low speed region including an idling rotational speed in the respective mode maps Mp1, Mp2, Mp3.

In this manner, according to this embodiment, when any one of the modes 1, 2, 3 is selected in response to the manipulation of the mode selection switch 8 by the driver, the corresponding mode map Mp1, Mp2 or Mp3 is selected, and the target torque is set based on the mode map Mp1, Mp2 or Mp3 and hence, the driver can enjoy three kinds of acceleration responses which differ completely from each other using one vehicle.

Here, an open/close speed of the throttle valve is also set such that the throttle valve is operated gently in the mode map Mp2 and is rapidly operated in the mode map Mp3.

Further, the T/M_ECU 23 is provided for performing the gear change control of the automatic transmission. To an input side of the T/M_ECU 23, a vehicle speed sensor 41 which detects a vehicle speed based on a rotational speed of a transmission output shaft or the like, an inhibiter switch 42 which detects a range in which the selection lever 7 is positioned are connected, while to an output side of the T/M_ECU 23, a control valve 43 which performs the gear change control of the automatic transmission and a lock-up actuator 44 which performs a lock-up operation of a lock-up clutch are connected. The T/M_ECU 23 determines the range of the selection lever 7 in response to a signal from the inhibitor switch 42. When the selection lever 7 is positioned in a D range, the T/M_ECU 23 performs the change gear control by outputting a change gear signal to the control valve 43 in accordance with a predetermined transmission pattern. Here, the transmission pattern is variably set corresponding to the modes 1, 2, 3 set in the E/G_ECU 22.

Further, when the lock-up condition is satisfied, a slip lock-up signal or a lock-up signal is outputted to the loch-up actuator 44 so as to changeover the relationship between input/output elements of a torque converter into a slip lock-up state or a lock-up state from a converter state. Here, the E/G_ECU 22 corrects the target torque τe when the state of the torque converter is changed to a slip lock-up state or a lock-up state. As a result, for example, when the mode M is set to the save mode 2, the target torque τe is corrected to the one which allows more economical traveling.

The navigation_ECU 24 is mounted in a well-known car navigation system, and detects a position of the vehicle based on positional data obtained from a GPS satellite or the like and, at the same time, calculates a guide route to the destination. Further, the navigation_ECU 24 displays the present position and the guide route of the own car as the map data on the center display 4. In this embodiment, the navigation_ECU 24 can display various information to be displayed on the MID 12 on the center display 4.

Next, steps for controlling the operation state of the engine executed by the above-mentioned E/G_ECU 22 is explained in accordance with flowcharts shown in FIG. 7 to FIG. 10.

Figure 7:
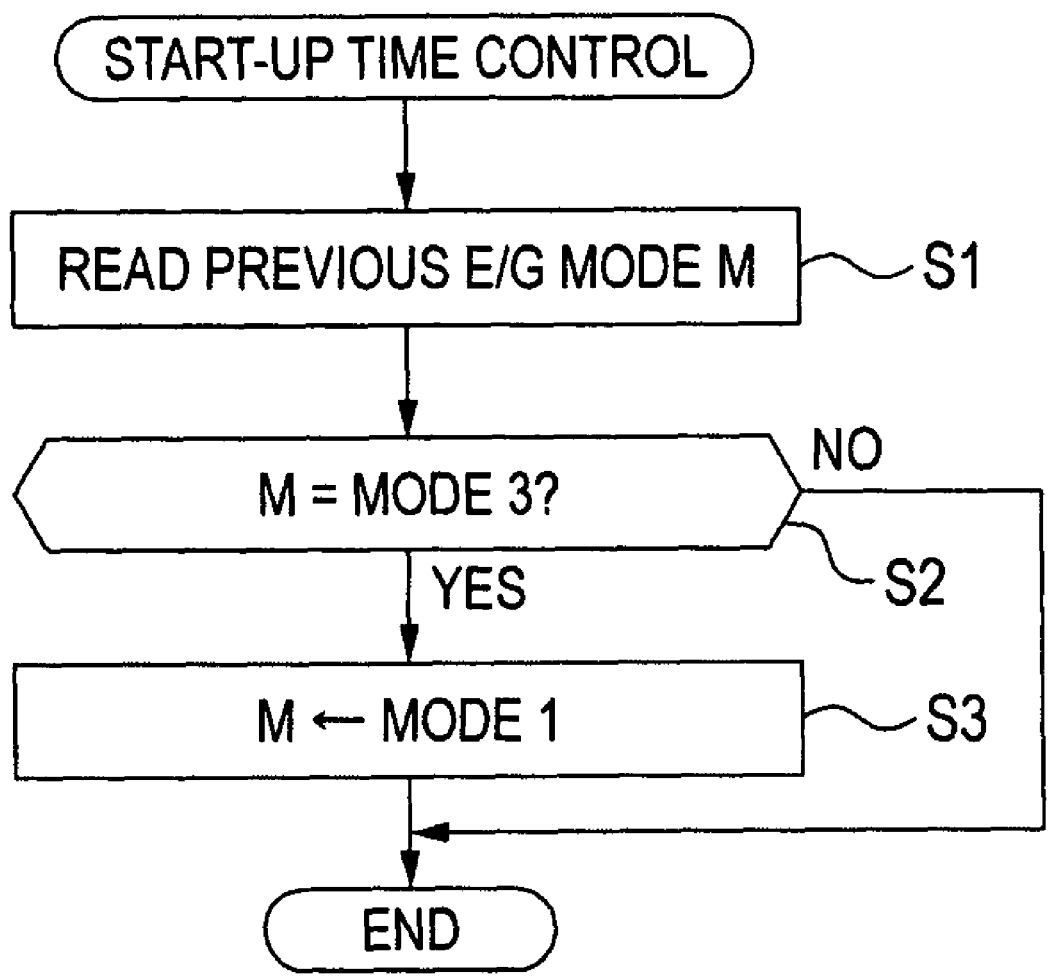
FIG. 7 is a flowchart showing a start-up control routine.

When the ignition switch is turned on, first of all, the start-up time control routine shown in FIG. 7 is initiated only one time. In this routine, first of all, in step S1, the mode M (M: normal mode 1, save mode 2, power mode 3) stored the last time the ignition switch was turned off is read.

Then, the processing advances to step S2, and it is determined whether the mode M is the power mode 3 or not. When the mode M is the power mode 3, the mode M is forcibly set to the normal mode 1 (M←mode 1) and the routine is finished.

Further, when the mode M is the mode other than the power mode 3, that is, the normal mode 1 or the save mode 2, the routine is finished as it is.

In this manner, when the mode M stored the last time the ignition switch was turned off is the power mode 3, the mode M at the time of turning on the ignition switch is forcibly changed to the normal mode 1 (M←mode 1), hence there is no possibility that the vehicle starts rapidly and, thus, the vehicle can obtain the favorable start performance even when the accelerator pedal 14 is slightly depressed.

Figure 8:
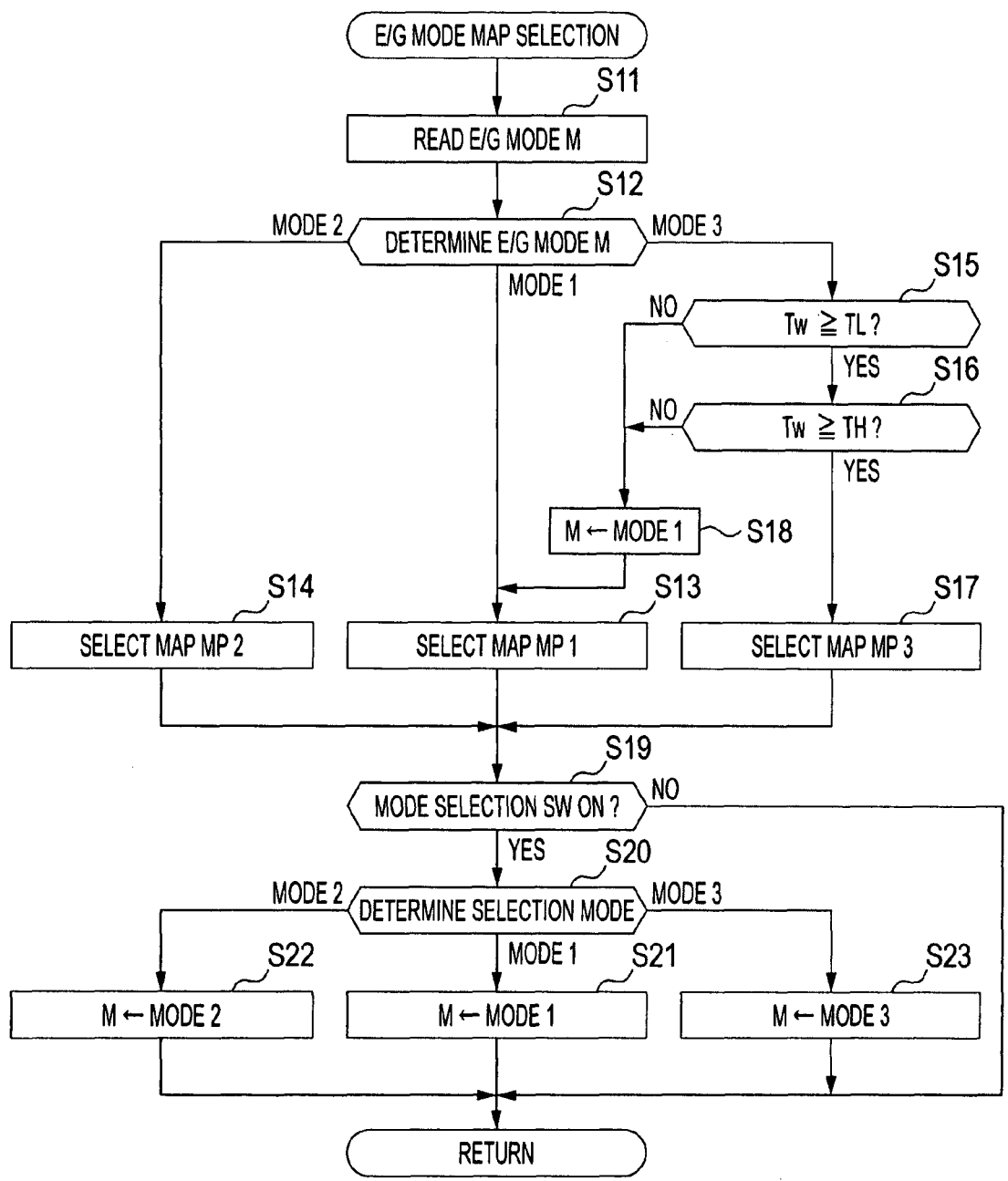
FIG. 8 is a flowchart showing a mode map selection routine.
Figure 9:
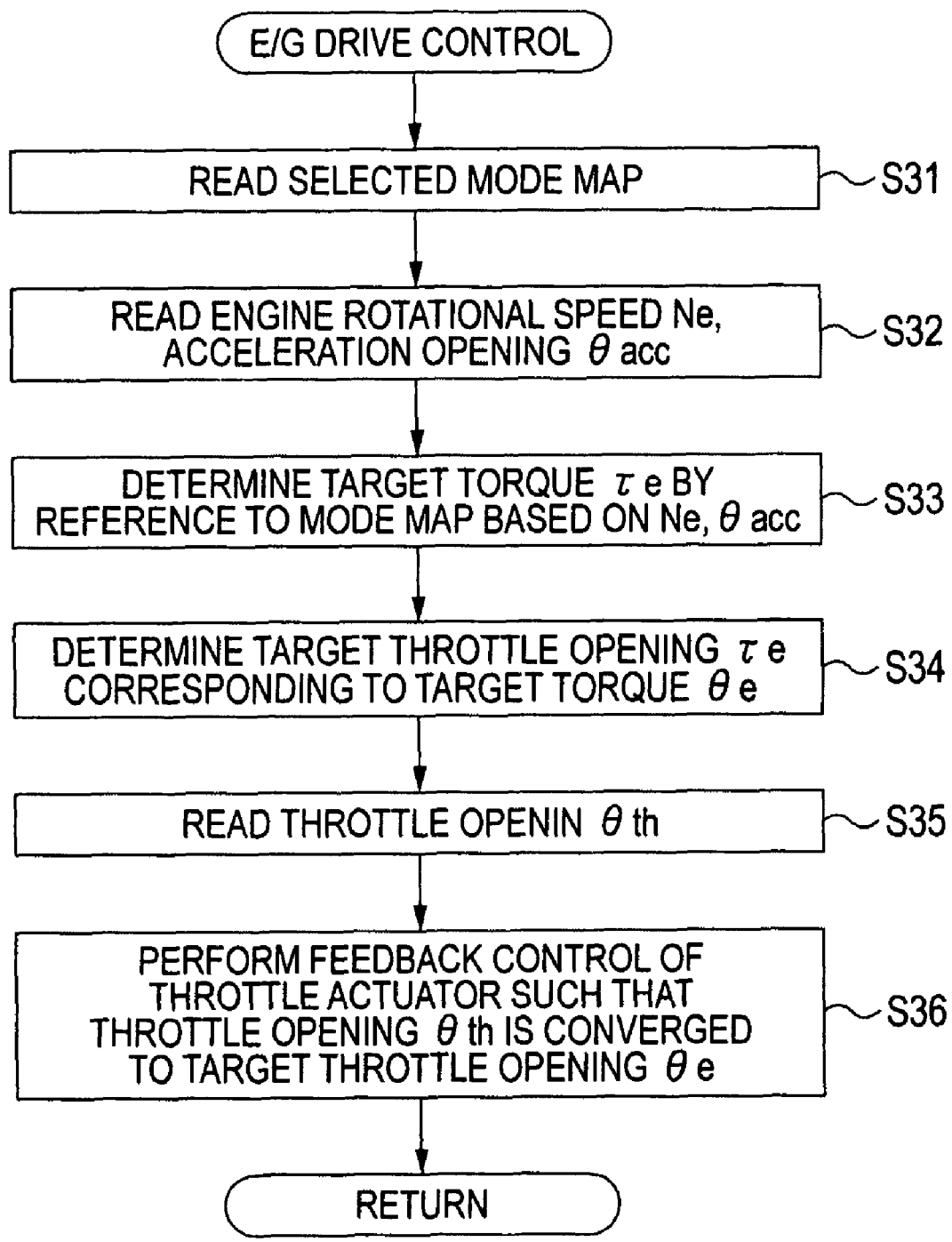
FIG. 9 is a flowchart showing an engine control routine.
Figure 10:
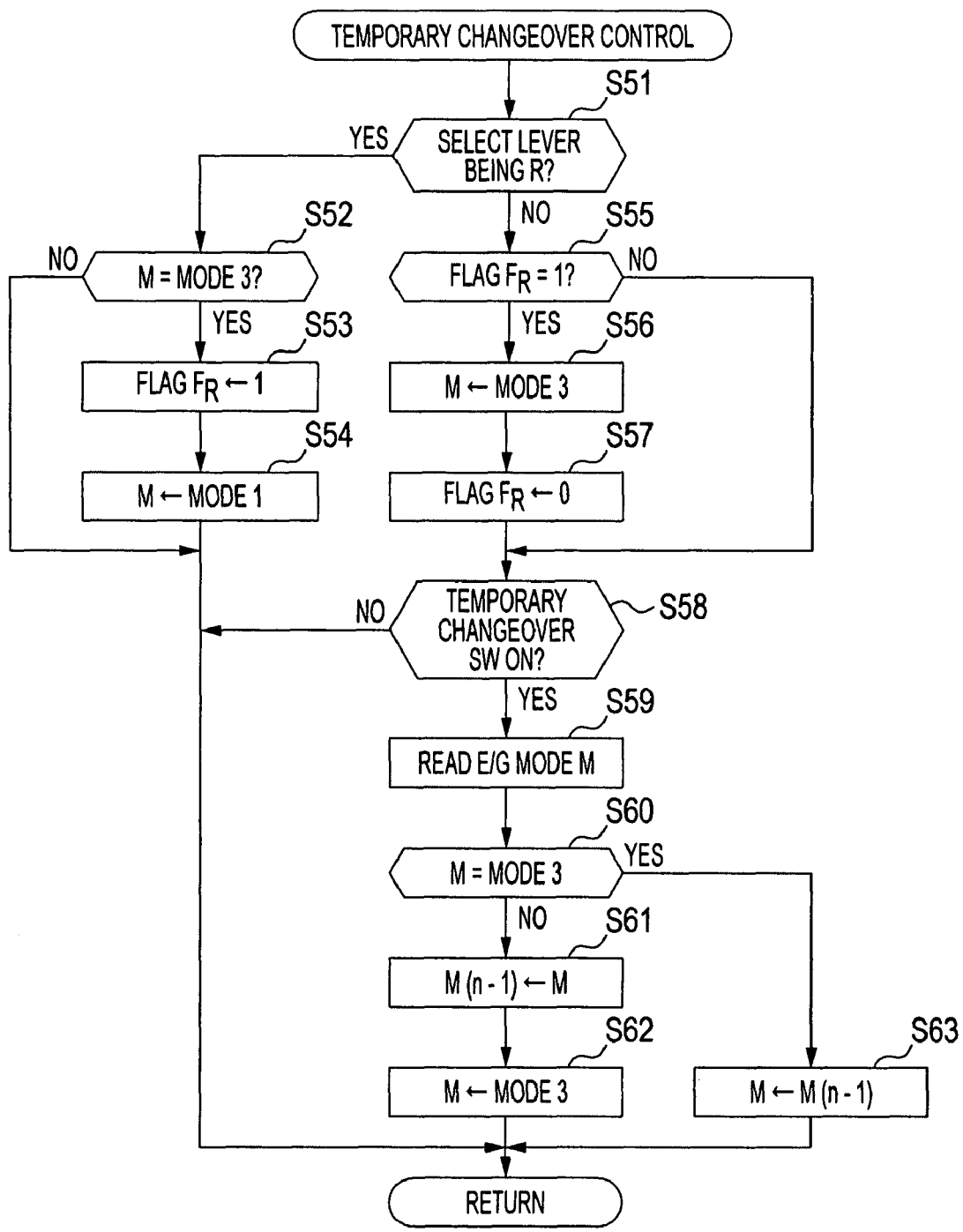
FIG. 10 is a flowchart showing a temporary changeover control routine.

Then, when this start-up time control routine is finished, the routines shown in FIG. 8 to FIG. 10 are executed for every predetermined calculation cycle. First of all, the mode map selection routine shown in FIG. 8 is explained.

In this routine, first of all, the currently set mode M is read in step S11, and it is determined which mode (normal mode 1, save mode 2 or power mode 3) is set by reference to the number of the mode M in step S12. Then, when set is the normal mode 1, the processing advances to step S13. When set is the save mode 2, the processing is branched to step S14. Further, when set is the power mode 3, the processing is branched to step S15. Here, at the time of executing the first routine after the ignition switch is turned on, the mode M is either one of the normal mode 1 or the save mode 2 and hence, the processing is not branched in step S15. However, when the driver rotates the manipulation knob 8a of the mode selection switch 8 in the right direction after the ignition switch is turned on to select the power S# mode, the mode M is set to the power mode 3 in step S23 described later and hence, the processing is branched to step S15 from step S12 at the time of executing succeeding routine.

Then, when it is determined that the mode M is set to the normal mode 1 and the processing advances to step S13, the normal mode map Mp1 stored in the non-volatile memory means of the E/G_ECU 22 is set as the mode map of this time and the processing advances to step S19. Further, when it is determined that the mode M is set to the save mode 2 and the processing advances to step S14, the save mode map Mp2 is set as the mode map of this time and the processing advances to step S19.

On the other hand, when it is determined that the mode M is set to the power mode 3 and the processing is branched to step S15, in steps S15 and S16, a cooling water temperature Tw detected by the water temperature sensor 33 as the engine temperature is compared with a predetermined lower temperature as a warm-up determination temperature TL and a predetermined upper temperature as an over heat determination temperature TH. Then, when it is determined that the cooling water temperature Tw is equal to or above the warm-up determination temperature TL (Tw≧TL) in step S15 and when it is determined that the cooling water temperature Tw is below the over heat determination temperature TH (Tw<TH) in step S16, the processing advances to step S17.

On the other hand, when it is determined that the cooling water temperature Tw is below the warm-up determination temperature TL (Tw<TH) in step S15 or when it is determined that the cooling water temperature Tw is equal to or above the over heat determination temperature TH (Tw>TH) in step S16, the processing is branched to step S18 and the mode M is set to normal mode 1 (M←mode 1) and the processing returns to step S13.

In this manner, according to this embodiment, even when the driver manipulates the mode selection switch 8 to select the power mode 3 after the ignition switch is turned on, the mode M is forcibly made to return to the normal mode 1 in the event that the cooling water temperature Tw is equal to or below the warm-up determination temperature TL or equal to or above the over heat determination temperature TH. Accordingly, a discharge quantity of exhaust emission can be suppressed at the time of engine warm-up, and the engine and its peripheral equipment can be protected from a heat defect by suppressing the output at the time of over heat. Here, when the mode M is forcibly made to return to the normal mode 1, the warning lamp 3f is turned on or blinked to inform the driver that the mode M is forcibly made to return to the normal mode 1. In this case, the return of the mode M to the normal mode 1 may be notified by a buzzer or sounds.

Next, when the processing advances to step S19 from any one of steps S13, S14 and S17, it is determined whether the mode selection switch 8 is manipulated or not. When it is determined that the manipulation of the mode selection switch 8 is not performed, the routine is finished. Further, when it is determined that the manipulation of the mode selection switch 8 is performed, the processing advances to step S20 and it is determined which mode is selected by the driver.

Then, when it is determined that the driver selects the normal mode (the knob 8a being rotated in the left direction), the processing advances to step S21 to set the mode M to the normal mode 1 (M←mode 1), and the routine is finished. Further, when it is determined that the driver selects the save mode 2 (the knob 8a being pushed) (M←mode 2), the processing advances to step S22 to set the mode M to the save mode 2 (M←mode 2), and the routine is finished. Further, when it is determined that the driver selects the power mode 3 (the knob 8a being rotated in the right direction), the processing advances to step S23 to set mode M to the power mode 3 (M←mode 3), and the routine is finished.

In this manner, in this embodiment, the E/G_ECU 22 functions as the mode selection control means.

In this embodiment, the mode M can be set to the power mode 3 by manipulating the knob 8a of the mode selection switch 8 after turning on the ignition switch and hence, it is also possible to start the vehicle with the power mode 3. In this case, the driver consciously selects the power mode and hence, the driver would not be frightened at the large driving force generated at the start.

Next, an engine control routine shown in FIG. 9 is explained.

In this routine, first of all, in step S31, the currently selected mode map (Mp1, Mp2 or Mp3: see FIG. 11) is read and, subsequently, in step S32, an engine rotational speed Ne detected by the engine rotational sensor 29 and accelerator opening degress θacc detected by the accelerator opening sensor 31 are read.

Then, the processing advances to step S33 in which a target torque τe which constitutes a driving force indication value is determined based on both parameters Ne and θacc by reference to the mode map read in step S31 with the interpolation calculation.

Next, the processing advances to step S34 in which a target throttle opening θe corresponding to the target torque τe is determined as a final driving force indication value.

Then, the processing advances to step S35 in which a throttle opening θth detected by the throttle opening sensor 32 is read. In step S36, a feedback control is applied to the throttle actuator 37 which performs an open/close operation of the throttle valve mounted in the electronic throttle control device such that the throttle opening θth is converged to the target throttle opening θe. Then, the routine is finished.

As a result, when the driver manipulates the accelerator pedal 14, the throttle valve is opened or closed in accordance with the mode maps Mp1, Mp2 and Mp3 corresponding to the mode M (M: normal mode 1, save mode 2, power mode 3) selected by the driver, using the accelerator opening degress θacc and the engine rotational speed Ne as parameters. When the mode M is set to the normal mode 1, an output torque is preset approximately linearly with respect to an operation amount of the accelerator pedal (accelerator opening degress θacc) and hence, the normal driving can be performed.

Further, when the mode M is set to the save mode 2, the elevation of the target torque is suppressed and hence, the driver can enjoy the acceleration work by widely using the stroke of the accelerator pedal 14 and, at the same time, it is possible to acquire both of easy drive ability and low fuel consumption in a well-balanced manner. Accordingly, even in case of a vehicle with a 3 litter engine, the smooth driving can be performed while ensuring a sufficient output corresponding to the 2 litter engine and hence, the vehicle can obtain the favorable driving performance in a practical-use region such as towns and the cities.

Further, when the mode M is set to the power mode 3, a high acceleration response is obtained and hence, the vehicle can perform more sporty traveling.

As a result, the driver can enjoy three kinds of acceleration responses which completely differ from each other with one vehicle. Accordingly, the driver can arbitrarily select the preferred driving force characteristic even after purchasing the vehicle and can drive the vehicles corresponding to three vehicles having different characteristics with one vehicle.

Further, in this embodiment, when the temporary changeover switch 11 which is mounted on the steering wheel 9 is manipulated or the selection lever 7 is positioned to the R range, the mode M is temporarily changed over. This temporarily changeover control is executed in accordance with a temporarily changeover control routine shown in FIG. 10.

In this routine, first of all, it is determined whether the selection lever 7 is positioned to the R range or not based on a signal from the inhibitor switch 42 in step S51. When it is determined that the selection lever 7 is positioned to the R range, the processing advances to step S52, while when the selection lever 7 is positioned to a range other than the R range, the processing advances to step S55.

When the processing advances to step S52, the current mode M is referred and the routine is finished except for a state in which the mode M is set to the power mode 3. Further, when the mode M is set to the power mode 3, the processing advances to step S53 to set a reverse flag FR (FR←1) and the processing advances to step S54 to set the mode M to the normal mode 1 (M←mode 1) and the routine is finished.

In this manner, according to this embodiment, when the selection lever 7 is moved to the R range in a state that the mode M is set to the power mode 3, the mode M is forcibly changed over to the normal mode 1 and hence, even when the accelerator pedal 14 is depressed slightly at driving the vehicle backward, there is no possibility that the vehicle suddenly travels backward thus acquiring the favorable backward travel performance.

On the other hand, when it is determined that the selection lever 7 is positioned to the range other than the R range in step S51 and the processing advances to step S55, the reverse flag FR is referred. When the reverse flag FR is 1 (FR=1), that is, in the first routine after the selection lever 7 is changed over to another range from the R range, the processing advances to step S56 in which the mode M is made to return to the power mode 3 (M←mode 3). Then the processing advances to step S57 in which the reverse flag FR is cleared (FR←0) and the processing advances to step S58.

As a result, in a state that after the mode M is forcibly changed over to the normal mode 1 from the power mode 3 because of the manipulation of the selection lever 7 to the R range, the selection lever 7 is moved to the D range, for example, the mode M is made to automatically return to the initial power mode 3 and hence, the driver can start the vehicle without feeling a discomfort.

Further, when it is determined that the reverse flag FR is 0 (FR=0) in step S55, the processing jumps to step S58.

Then, when the processing advances to step S58 from step S55 or step S57, it is determined whether the temporary changeover switch 11 is turned on or not. Then, when it is determined that the temporary changeover switch 11 is not turned on, the routine is finished as it is.

On the other hand, when it is determined that the temporary changeover switch 11 is turned on, the processing advances to step S59 to read the current mode M, and in step S60, it is determined whether the mode M is set to the power mode 3 or not.

Then, when it is determined that the mode M is set to a mode (normal mode 1 or save mode 2) other than the power mode 3, the processing advances to step S61 in which the mode M at the time the temporary changeover switch 11 is turned on is stored as a previous mode M(n−1) (M(n−1)←M) and the processing advances to step S62. In step S62, the current mode M is set to the power mode 3 (M←mode 3) and the routine is finished.

In this manner, according to this embodiment, even when the mode M is set to the normal mode 1 or the save mode 2 using the mode selection switch 8, the mode M can be changed over to the power mode 3 by turning on the driver's-side temporary changeover switch 11. As a result, in traveling an ascending slope which requires power, the mode M can be easily changed over to the power mode 3 from the normal mode 1 or the save mode 2 temporarily and hence, the vehicle can acquire the favorable traveling performance. Further, the temporary changeover switch 11 is mounted on the steering wheel 9 and hence, the driver can easily change over the mode M without leaving his/her hand from the steering wheel 9 thus improving the manipulability.

Further, when it is determined that the current mode M is set to the power mode 3 in step S60, the processing is branched to the step S63 in which the previous mode M(n−1) is read to be the current mode M (M←M(n−1)) and the routine is finished.

As a result, by manipulating the temporary changeover switch 11 again after the mode M is temporarily changed over to the power mode 3, the mode M is made to return to the initial mode M (normal mode 1 or save mode 2).

Next, a control of a fuel consumption meter 13 which is executed by the meter_ECU 21 is explained.

In this embodiment, to the meter_ECU 21, a fuel injection pulse width (pulse time) which is calculated by the E/G_ECU 22 and a vehicle-speed signal from a vehicle-speed sensor 41 which is read by the T/M_ECU 23 are inputted through an interior communication circuit 16.

The meter_ECU 21 calculates a fuel injection quantity Fi and a mileage Li within a preset set time t (for example, t=0.1[s]) based on these respective input signals, and calculates an instantaneous fuel consumption Fci based on both parameters. Further, in parallel to these calculations, the meter_ECU 21 respectively calculates the respective cumulative values F, L of the fuel injection quantity Fi and the mileage Li which are continuously repeatedly calculated for every set time t and calculates the average fuel consumption Fc based on these cumulative values.

Then, the meter_ECU 21 displays the deviation ΔFc of the instantaneous fuel consumption Fci with respect to the current average fuel consumption Fc on the fuel consumption meter 13 which constitutes a display means as fuel information. That is, in this embodiment, when the deviation ΔFc takes a positive value, the meter_ECU 21 swings the pointer 13a in the plus direction with respect to a neutral position with swinging width corresponding to the deviation quantity |ΔFc| due to a drive control of the pointer 13a through a fuel consumption meter drive part 28.

On the other hand, the meter_ECU 21 swings the pointer 13a in the minus direction with respect to the neutral position with swinging width corresponding to the deviation quantity |ΔFc| due to a drive control of the pointer 13a through the fuel consumption meter drive part 28.

Here, the meter_ECU 21 can change the swinging width of the pointer 13a corresponding to the deviation ΔFc for respective the normal mode 1, the save mode 2, the power mode 3. That is, gains (G1, G2, G3) for defining the swinging width of the pointer 13a for the respective modes 1, 2, 3 are preset in the meter_ECU 21. Then, the meter_ECU 21, when the manipulation signal of the mode selection switch 8 is inputted, determines the newly selected mode and changes over the corresponding gain. Here, the respective gains G1, G2, G3, for example, are set such that the gain G2 corresponding to the save mode 2 most suitable for low-fuel-consumption traveling becomes largest and the gain G3 corresponding to the power mode 3 which exhibits the highest response to the accelerator operation of the driver becomes the smallest value.

To be specific, for example, the gain G1 is set to a gain which allows a range from −15[Km/L] to 15[Km/L] as a full scale, the gain G2 is set to a gain which allows a range from −10[Km/L] to 10[Km/L] as a full scale, and the gain G3 is set to a gain which allows a range from −30[Km/L] to 30[Km/L] as a full scale. In this manner, in this embodiment, the larger the responsiveness of the mode of the drive force characteristic of the vehicle with respect to the accelerator operation of the driver, the meter_ECU 21 sets a band which displays the fuel information in a full scale relatively wider than other modes.

Further, the meter_ECU 21, when a trip reset switch 3g is turned on due to a prolonged pushing manipulation for a set time or more by the driver, the cumulative values F, L of the fuel injection quantity and the mileage are reset. Here, these cumulative values F, L are not limited to values which are cleared interlockingly with the trip reset switch 3g. For example, these cumulative values F, L may be cleared interlockingly with opening of a fuel flapper at the time of filling oil.

In this manner, in this embodiment, the meter_ECU 21 has respective functions of an instantaneous fuel consumption calculation means, an average fuel consumption calculation means and a display control means.

Figure 12:
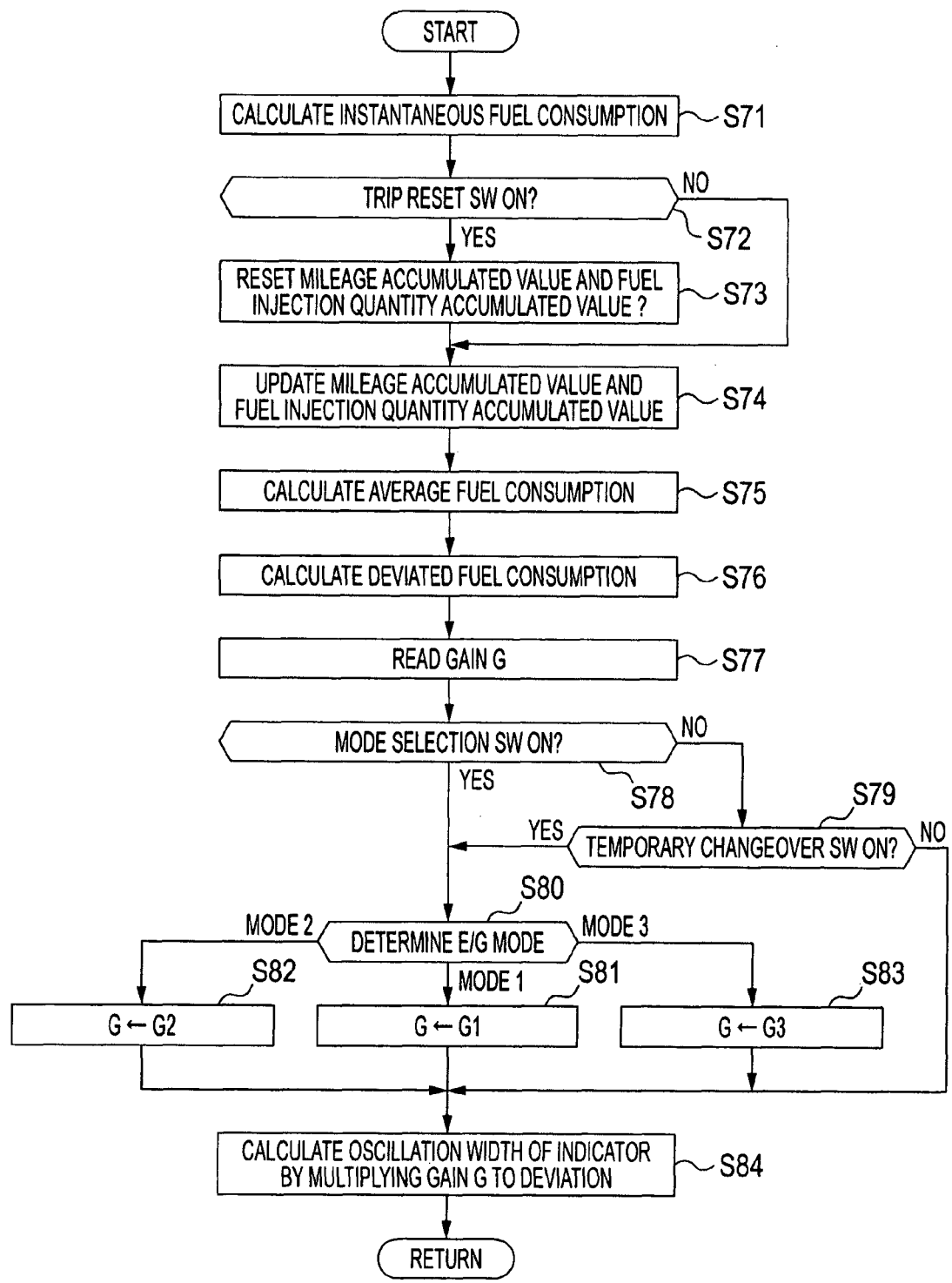
FIG. 12 is a flowchart showing a fuel consumption meter display control routine.

A control of the fuel consumption meter 13 by the meter_ECU 21 is, for example, repeatedly executed for every set time in accordance with a flowchart of the fuel consumption meter display control routine shown in FIG. 12.

In this routine, first of all, in step S71, the current instantaneous fuel consumption Fci is calculated. That is, in step S71, for example, fuel injection pulses within a set time t are counted and the fuel injection quantity Fi is obtained based on a following formula (1) using a counter value C of the fuel injection pulses. Here, the calculation of the fuel injection quantity Fi may be performed by the E/G_ECU 22.

$$Fi = Q \times C \times K1 \quad (1)$$

Here, in the formula (1), Q corresponds to a fuel flow rate when the injector is fully opened for 1 second, and K1 is a coefficient.

Next, for example, the mileage Li within the set time t is obtained by a following formula (2) using a vehicle speed V detected by a vehicle speed sensor 41.

$$Li = V \times t \times K2 \quad (2)$$

Here, in the formula (2), K2 is a coefficient.

Thereafter, the current instantaneous fuel consumption Fci is obtained by a following formula (3), for example, using the fuel injection quantity Fi and the mileage Li.

$$Fci = Li/Fi \quad (3)$$

Then, when the processing advances to step S72 from step S71, it is determined whether the trip reset switch 3g is turned on or not. When the trip reset switch 3g is turned on, the processing advances to step S73 and the cumulative value L of the mileage and the cumulative value F of the fuel injection quantity up to the present are reset (L←0, F←0) and, thereafter, the processing advances to step S74. On the other hand, in step S72, when it is determined that the trip reset switch 3g is not turned on, the processing advances to step S74 as it is.

When the processing advances to step S74 from step S72 or step S73, using the mileage Li and the fuel injection quantity Fi which are calculated in the above-mentioned step S71, the accumulated mileage value L and the accumulated fuel injection value F are respectively updated (L←L+1, F ←F+Fi).

Thereafter, in step S75, the average fuel consumption Fc up to the present from resetting of the counter value of the trip meter based on the above-mentioned accumulated mileage value L and accumulated fuel injection value F are obtained by a following formula (4), for example.

$$Fc=L/F \quad (4)$$

Then, in step S76, the deviation ΔFc of the instantaneous fuel consumption Fci with respect to the current average fuel consumption Fc is obtained by a following formula (5), for example.

$$\Delta Fc=Fci-Fc \quad (5)$$

Then, when the processing advances to step S77 from step S76, the currently set gain G is read and, in succeeding step S78, it is determined whether the mode selection switch 8 is turned on or not. Then, in step S78, when it is determined that the mode selection switch 8 is turned on, the processing advances to step S80. On the other hand, when it is determined that the mode selection switch 8 is not turned on, the processing advances to step S79.

When the processing advances to step S79 from step S78, it is determined whether the temporary changeover switch 11 is turned on or not. When it is determined that the temporary changeover switch 11 is turned on, the processing advances to step S80, while when it is determined that the temporary changeover switch 11 is not turned on, the processing advances to step S84.

Then, when the processing advances to step S80 from step S78 or step S79, the mode which is newly selected by the ON manipulation of the mode selection switch 8 or the temporary changeover switch 11 is determined. As a result, when it is determined that the mode 1 is newly selected as the mode, the processing advances to step S81. After the gain G is changed over to G1, the processing advances to step S84. Further, when it is determined that the mode 2 is newly selected as the mode, the processing advances to step S82. After the gain G is changed over to G2, the processing advances to step S84. Further, when it is determined that the mode 3 is newly selected as the mode, the processing advances to step S83. After the gain G is changed over to G3, the processing advances to step S83.

When the processing advances to step S84 from any one of steps S81 to step S83, an swinging width (control indication value) of the pointer 13a is calculated by multiplying the deviation ΔFc with the currently set gain G and, thereafter, the routine is finished.

Figure 13A:
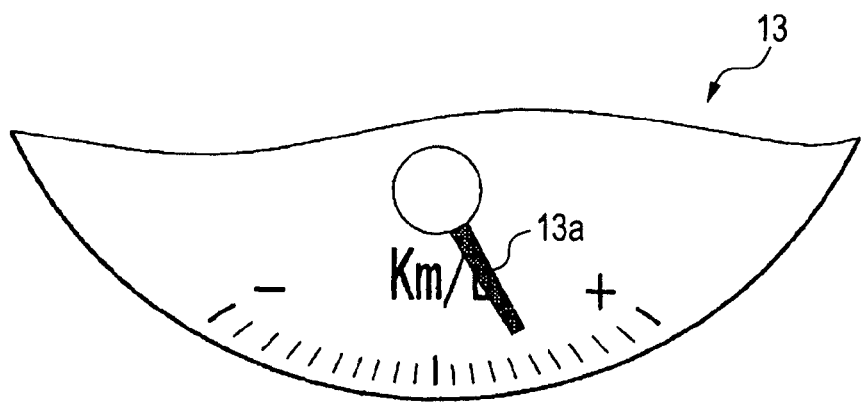
FIG. 13A to FIG. 13C are explanatory views showing a swinging width of a pointer in respective modes.
Figure 13B:
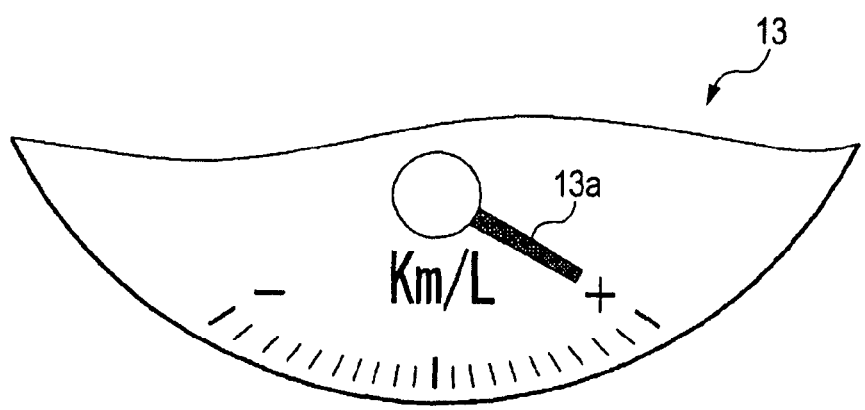
Figure 13C:
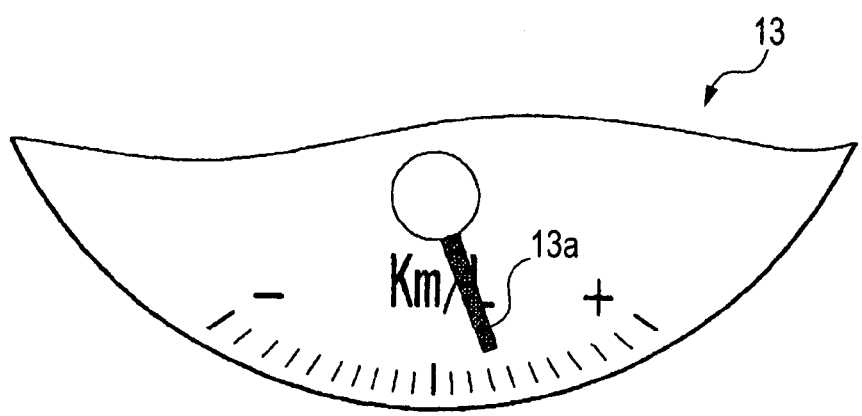

As a result, the fuel meter drive part 28 drives an actuator (for example, stepping motor 28a: see FIG. 6) which is connected to the pointer 13a with a drive quantity corresponding to the control indication value. Due to such a constitution, for example, as shown in FIGS. 13(a) to (c), a display control of the fuel consumption meter 13 is performed with a swinging width of the pointer 13a which differs for the normal mode 1, the save mode 2, and the power mode 3. Here, FIGS. 13(a) to (c) show the display examples of the fuel consumption meter 13 in the respective modes when the deviation ΔFc=10[Km/L], wherein FIG. 13(a) shows the display when the mode is set to the normal mode 1, FIG. 13(b) shows the display when the mode is set to the save mode 2, and FIG. 13(c) shows the display when the mode is set to the power mode 3.

According to such a fuel consumption meter control, by calculating the instantaneous fuel consumption Fci of the vehicle based on the mileage Li and the fuel injection quantity Fi within the set time t, by calculating the average fuel consumption Fc of the vehicle based on the respective cumulative values L, F of the mileage Li and the fuel injection quantity Fi calculated repeatedly, and by displaying the deviation ΔFc of the instantaneous fuel consumption Fci with respect to the average fuel consumption Fc is displayed on the fuel consumption meter 13 as the fuel consumption information, it is possible to always display the fuel consumption information at the time of traveling using the proper fuel consumption value (average fuel consumption) as the reference. That is, with the use of the average fuel consumption, it is possible to use the fuel consumption value which sufficiently reflects the change of vehicle with a lapse of time, a technique of the driver or the like as the reference. By displaying the deviation with the instantaneous fuel consumption using the fuel consumption value as the reference, it is possible to display the fuel consumption information which constitutes the traveling information in a useful and optimum mode.

Here, by displaying the deviation ΔFc on the fuel consumption meter 13 with a full scale display which differs for every mode, it is possible to display the fuel consumption information in an optimum mode which conforms to feeling of the driver. That is, for example, in the save mode in which the enhancement of the fuel consumption is expected, by largely controlling a swinging width of the pointer 13a with respect to the deviation ΔFc by setting the gain relatively largely, it is possible to urge the driver to make the deliberate driving. On the other hand, for example, in the power mode 3 in which the high response is required with respect to the acceleration work, by controlling the swinging width of the pointer 13a with respect to the deviation ΔFc by setting the gain to a relatively small value, it is possible to reduce a discomfort of the driver attributed to the large swinging of the pointer 13a at the time of acceleration. Here, for example, by setting the gain G3 corresponding to the power mode 3 to "zero", it is possible to hold the pointer 13a at the neutral position at the time of selecting the power mode 3.

Further, by performing the display on the fuel consumption meter 13 with swinging of the pointer 13a with respect to the neutral position, the driver can easily recognize the fuel consumption information with naked eyes.

Further, by resetting the accumulated values L, F of the mileage and fuel injection quantity interlockingly with the reset manipulation of the trip meter (manipulation of the trip reset switch 3g) by the driver, the driver can restart the calculation of the average fuel consumption at timing of performing the fuel consumption calculation or the like.

Here, in calculating the average fuel consumption by the meter_ECU 21, with respect to the average fuel consumption which is directly calculated based on the accumulated mileage value L and the accumulated fuel injection value F, the value which is leveled by weighted average calculation using the past (previous-time) average fuel consumption may be calculated as the final average fuel consumption. In this case, assuming the average fuel consumption (intermediate value) which is obtained based on the cumulative values L, F as Fca and the past average fuel consumption as Fc(n−1), the average fuel consumption Fc is obtained by a following formula (6).

$$Fc = (((Fc(n-1) \cdot (K3-1)) + Fca)/K3 \tag{6}$$

Here, in the formula (6), K3 is a weighting coefficient.

By leveling the average fuel consumption Fc using the past average fuel consumption, it is possible to smoothly swing the pointer 13a.

Further, in such a calculation of the average fuel consumption Fc, the weighting coefficient K3 may be changed over for every mode. In this case, a value of the weighting coefficient corresponding to each mode may be preferably set such that a value corresponding to the save mode 2 most preferable to low-fuel-consumption traveling assumes a smallest value and a value corresponding to the power mode 3 which exhibits the highest response for the acceleration of the driver assumes a large value. For example, with respect to the weighting coefficient K3 corresponding to each mode, by setting the coefficient corresponding to the normal mode 1 to 500 (K3=500), the coefficient corresponding to the save mode 2 to 100 (K3=100), and the coefficient corresponding to the power mode 3 to 1000 (K3=1000), it is possible to suppress a rapid change of the pointer 13a along with the increase of the response of the mode.

Here, to preferably indicate the improvement of the fuel consumption by the fuel consumption meter 13 to the driver, particularly, it is preferable to set the above-mentioned gain G (=G2) and the weighting coefficient K3 corresponding to the save mode 2 with which the enhancement of the fuel consumption is most expected based on following requirements, for example.

For example, the gain G2 corresponding to the save mode 2 is preferably set such that a region (first region) which indicates the deviation ΔFc which is calculated corresponding to the acceleration manipulation quantity which allows the driver to actually feel that the accelerator operation is performed and with which the average fuel consumption Fc is hardly changed occupies approximately ⅕ of the whole of the fuel consumption meter 13 with respect to the zero point which constitutes the center. Further, the gain G2 corresponding to the save mode 2 is preferably set such that a region (second region) which indicates the deviation ΔFc when the average fuel consumption Fc is largely changed respectively occupies approximately ¼ of the whole fuel consumption meter 13 on the plus side and on the minus side of the fuel consumption meter 13.

Figure 14:
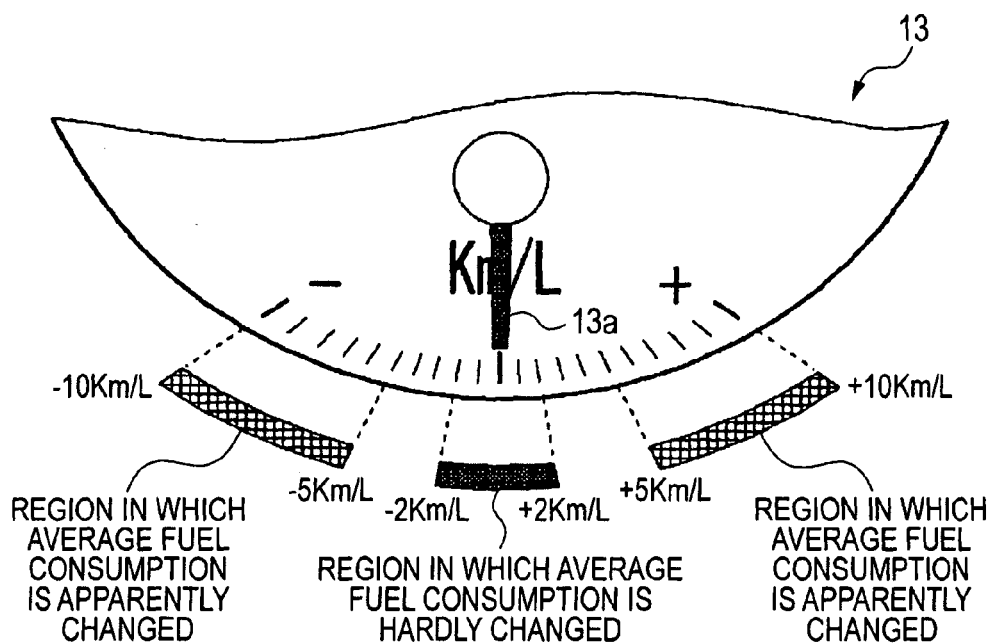
FIG. 14 is an explanatory view showing respective regions of a fuel consumption meter.

By taking these requirements into consideration, in this embodiment, as the gain G2 corresponding to the save mode 2, to be more specific, as mentioned previously, a gain which enables a display of the deviation ΔFc within a range from −10[Km/L] to 10[Km/L] on the fuel consumption meter 13 is set. Due to such gain setting, in the save mode 2, for example, to a region which occupies approximately ⅕ of the whole of the fuel consumption meter 13 at a center portion of the fuel consumption meter 13, the deviation ΔFc (=−2[Km/L] to 2[Km/L]) with which the average fuel consumption Fc is hardly changed is allocated. Further, to regions which respectively occupy approximately ¼ of the whole of the fuel consumption meter 13 on the plus side and on the minus side of the fuel consumption meter 13, the deviation ΔFc (=5[Km/L] to 10[Km/L]) and ΔFc (=−10[Km/L] to −5[Km/L]) with which the average fuel consumption Fc is largely (apparently) changed is allocated (see FIG. 14).

Further, it is preferable to set the weighting coefficient K3 corresponding to the save mode 2 to a value which changes the deviation ΔFc with respect to the acceleration work of the driver with favorable tracking ability (sensitively) at least within a preset specified region. To be more specific, the weighting coefficient K3 corresponding to the save mode 2 is preferably set to a value which sensitively changes the deviation ΔFc with respect to the acceleration work of the driver within a region which occupies ⅕ of the whole fuel consumption meter 13 at the center portion of the fuel consumption meter 13 (that is, within the first region), for example. By taking such requirements into consideration, in this embodiment, the weighting coefficient K3 corresponding to the save mode 2 is set to 100 (K3=100) as mentioned above.

In this manner, by allocating the region corresponding to the deviation ΔFc with which the driver actually feels the accelerator operation and the average fuel consumption Fc is hardly changed to the region which occupies ⅕ of the whole fuel consumption meter 13, it is possible to preferably indicate the fluctuation of the deviation ΔFc in a close-up manner even when the change of the average fuel consumption Fc is small without making the driver feel bothersome excessively. Further, by changing the deviation ΔFc of the close-up region with favorable tracking ability with respect to the acceleration work of the driver, the fuel consumption meter 13 of this embodiment can make the driver conscious of the deliberate or careful acceleration work, for example, not only in a driving state such as an acceleration time in which the average fuel consumption Fc is largely changed but also in a driving state such as a constant-speed traveling in which the change of the average fuel consumption Fc is small.

Here, not to mention that the above-mentioned gain G and weighting coefficient K3 differ among vehicle kinds, the gain G and the weighting coefficient K3 also differ among modes. In this embodiment, the gains G and the weighting coefficients K3 respectively corresponds to the normal mode 1 and the power mode 3 are respectively set to proper values using the gain G and the weighting coefficient K3 corresponding to the save mode 2 as the references. Further, the gains G and the weighting coefficients K3 respectively corresponding to the normal mode 1 and the power mode 3 may be set by taking requirements substantially equal to the respective requirements indicated in the save mode 2 into consideration.

Further, the meter_ECU 21 may simultaneously calculate plural sets of combinations of the cumulative value L of the mileage and the cumulative value F of the fuel injection quantity using different reset timings as starting points and the average fuel consumption Fc may be obtained for every set. Then, by calculating the deviation ΔFc using the average fuel consumption Fc selected by the driver among the plurality of average fuel consumptions Fc, it is possible to effectively display the fuel consumption information which the driver requires in respective traveling scenes. In such constitution, it is desirable to set the average fuel consumption displayed on the multi-information display 12 (see FIG. 4(b)) to a value equal to the average fuel consumption used for the display of the fuel consumption meter 13.

Figure 15:
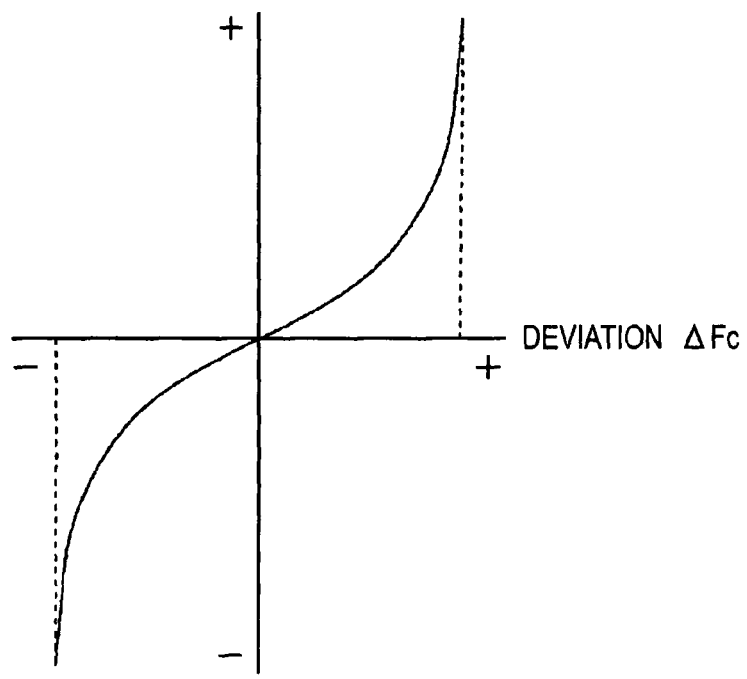
FIG. 15 is a characteristic graph of a control indication value with respect to the deviation.

Further, in calculating the control indication value by the meter_ECU 21, for example, a change quantity of a control indication value may be increased exponentially along with the increase of the deviation quantity |ΔFc| as shown in FIG. 15, for example, by exponentially converting the deviation ΔFc. Due to such constitution, swinging of the pointer 13a in the vicinity of the neutral position can be suppressed.

Further, the meter_ECU 21 may also make the tracking ability (tracking time) with respect to the target value of swinging of the pointer 13a calculated by the fuel consumption meter drive part 28 based on the control indication value, for example, different for every mode. Also in this case, by setting the prolonged tracking time along with the increase of the response of the mode, it is possible to suppress the rapid change of the pointer 13a.

The present invention is not limited to the above-mentioned embodiment. For example, two kinds or four kinds or more of mode maps which differ in drive force characteristics from each other may be set. By setting the mode maps in this manner, the driver can drive the vehicle corresponding to two or four or more vehicles having different driving force characteristics with one vehicle. Further, the driving force characteristic of the mode map may be changed corresponding to liking of the driver.

Further, in this embodiment, the case in which the target torque is set using the plurality of mode maps having the plurality of different driving force characteristics based on the accelerator opening and the engine rotational speed is explained. However, the present invention is not limited to such a case and the target torques of the respective drive force characteristics may be obtained by calculation based on the accelerator opening and the engine rotational speed.

Further, in this embodiment, the explanation is made using the throttle actuator 37 which drives the throttle valve mounted on the electric control throttle device as a controlling object. However, the controlling object is not limited to the throttle actuator 37. For example, in the diesel engine, an injector drive device may be set as the controlling object and an injection quantity of fuel injected from the injector drive device may be set based on a target torque τe.

Further, in an engine which performs an open/close operation of an intake valve using a solenoid valve mechanism, the solenoid valve mechanism may be set as the controlling object and the valve opening of the intake valve which is driven by the solenoid valve mechanism may be set based on the target torque τe.

Further, in the above-mentioned fuel consumption meter display control, the explanation has been made with respect to the example in which when either one of the mode selection switch 8 and the temporary changeover switch 11 is turned on, the gain for display of the fuel consumption meter 13 is changed over. However, the present invention is not limited to such a case. For example, it may be possible to set the gain such that the gain is changed over only when the mode selection switch 8 is turned on. Due to such constitution, in the passing traveling or the like, it is possible to prevent the swinging width of the pointer 13a from being largely changed frequently each time the temporary changeover switch 11 is manipulated by the driver.

Further, in the above-mentioned fuel consumption meter display control, the explanation has been made with respect to a case in which the swinging width of the pointer 13a is controlled with the gain which differs for every mode. However, the present invention is not limited to such a case and a single gain may be used.

Further, the display of the fuel consumption information on the fuel consumption meter 13 is not limited to the display using the pointer. Further, the display states of the minus side and the plus side with respect to the neutral position may be displayed with colors different from each other (for example, yellow on the minus side and green on the plus side).

Further, the above-mentioned fuel consumption meter display control is applicable to any type of vehicles on which various power units are mounted. Here, for example, when the above-mentioned fuel consumption meter control is applied to the power unit which allows the co-existence of driving force characteristic in a plurality of modes by changing over the gear change characteristic of the transmission into a plurality of modes with respect to the single mode, the gain may be changed over for every mode set with respect to the transmission.

Further, in the above-mentioned fuel consumption meter display control, the explanation has been made with respect to one example in which the average fuel consumption is properly reset in response to the manipulation of the trip reset switch or the like. However, the present invention is not limited to such an example and the average fuel consumption may be calculated based on the cumulative value of the mileage and the cumulative value of the fuel injection quantity from a point of time that the vehicle is delivered to the user.

What is claimed is:

1. A vehicle display device comprising:
an instantaneous fuel consumption calculation unit for calculating an instantaneous fuel consumption of a vehicle based on a mileage and a fuel injection quantity within a preset set time;
an average fuel consumption calculation unit for calculating an average fuel consumption of the vehicle based on a cumulative value of the mileage and a cumulative value of the fuel injection quantity;
a display unit comprising a pointer type meter for displaying a deviation of the instantaneous fuel consumption with respect to the average fuel consumption as a fuel consumption information based on a swinging of a pointer with respect to a neutral position; and
a display control unit for controlling said display unit so as to display the fuel consumption information by swinging the pointer in a plus direction set on one side of the neutral position with a swinging width corresponding to a deviation quantity when the deviation comprises a positive value, and swinging the pointer in a minus direction set on another side of the neutral position with a swinging width corresponding to the deviation quantity when the deviation comprises a negative value,
wherein said average fuel consumption calculation unit calculates a value which is obtained by leveling an average fuel consumption which is directly calculated based on the cumulative value of the mileage and the cumulative value of the fuel injection quantity by weighted average calculation by using a past average fuel consumption as a final average fuel consumption, and
wherein a weighting coefficient used in the weighted average calculation is a value which changes the deviation between the average fuel consumption and the instantaneous fuel consumption with respect to an accelerator operation of a driver in a preset region of the accelerator operation.

2. The vehicle display device according to claim 1, wherein regions in which the pointer swings are displayed with colors different from each other between the plus side and the minus side with respect to the neutral position.

3. The vehicle display device according to claim 1, wherein said display unit is arranged on a speed meter.

4. The vehicle display device according to claim 1, wherein the specified region is a region which indicates the deviation calculated corresponding to at least an acceleration manipulation quantity in which the driver actually feels that the acceleration manipulation is performed and the deviation with which the average fuel consumption is hardly changed with respect to the instantaneous fuel consumption.

5. The vehicle display device according to claim 4, wherein the display control unit sets a full scale of the display unit such that the specified region occupies approximately ⅕ of the whole display means.

6. The vehicle display device according to claim 5, wherein the display control unit sets the full scale of the display unit such that the region which indicates the deviation when the average fuel consumption is greatly changed with respect to the instantaneous fuel consumption occupies approximately ¼ of the whole display unit respectively on the plus side and the minus side with respect to the neutral position of the display means which constitutes a 0 point.

7. The vehicle display device according to claim 1, wherein the vehicle display device is mounted on a vehicle which is capable of changing over a drive force characteristic of a power unit into a plurality of modes, and
wherein the average fuel consumption calculation unit performs the weighted average calculation using weighting coefficients which differ for respective modes.

8. The vehicle display device according to claim 7, wherein the values of the weighting coefficient is such that when the mode of the drive force characteristic has greater responsiveness with respect to the accelerator operation of the driver, the mode takes a relatively greater value than an other mode.

9. The vehicle display device according to claim 7, wherein the power unit controls a drive force characteristic of an engine control device.

10. The vehicle display device according to claim 1, wherein the average fuel consumption value calculation unit resets the cumulative values of the mileage and the fuel injection quantity interlockingly with a reset manipulation of a trip meter by a driver.

11. The vehicle display device according to claim 10, wherein the average fuel consumption calculation unit calculates plural sets of combinations of the cumulative value of the mileage and the cumulative value of the fuel injection quantity using different reset timings as starting points and obtains the average fuel consumption for every set, and
wherein the display control means obtains the deviation with the instantaneous fuel consumption using the average fuel consumption which the driver selects out of the plurality of average fuel consumptions.

12. The vehicle display device according to claim 1, wherein the display control unit exponentially increases a change quantity of a control indication value when the deviation is displayed on the display unit as fuel consumption information along with an increase of the deviation quantity.

13. The vehicle display device according to claim 12, wherein the vehicle display device is mounted on the vehicle capable of changing over a drive force characteristic of a power unit into a plurality of modes, and
wherein the display control unit makes a tracking characteristic with respect to a target value of swinging of the pointer different for every mode.

14. The vehicle display device according to claim 1, wherein the deviation quantity comprises a scaled-deviation quantity which is scaled by a factor.

15. The vehicle display device according to claim 1, wherein the fuel injection quantity is determined based on a fuel injection pulse time.

16. The vehicle display device according to claim 1, wherein the instantaneous fuel consumption comprises a ratio of distance over fuel injection quantity.

17. The vehicle display device according to claim 1, wherein the neutral position indicates the average fuel consumption.

18. The vehicle display device according to claim 1, wherein the deviation is a difference between the instantaneous fuel consumption and the average fuel consumption.

19. A vehicle display device comprising:
a fuel consumption calculation unit for calculating a fuel consumption of a vehicle based on a ratio of a distance traveled and a fuel injection quantity, within a preset set time;
an average fuel consumption calculation unit for calculating an average fuel consumption of the vehicle based on a ratio of a cumulative value of the distance traveled and the cumulative value of the fuel injection quantity; and
a display unit comprising a pointer type meter for displaying a deviation of the fuel consumption with respect to the average fuel consumption as a fuel consumption information based on a swinging of a pointer with respect to a neutral position,
wherein said average fuel consumption calculation unit calculates a value which is obtained by leveling an average fuel consumption which is directly calculated based on the cumulative value of the distance traveled and the cumulative value of the fuel injection quantity by weighted average calculation by using a past average fuel consumption as a final average fuel consumption, and
wherein a weighting coefficient used in the weighted average calculation is a value which changes the deviation between the average fuel consumption and the fuel con in ion with respect to an accelerator operation of a driver in a preset region of the accelerator operation.

* * * * *